(12) United States Patent
Yip et al.

(10) Patent No.: US 9,156,006 B2
(45) Date of Patent: Oct. 13, 2015

(54) HIGH FLUX THIN-FILM COMPOSITE FORWARD OSMOSIS AND PRESSURE-RETARDED OSMOSIS MEMBRANES

(75) Inventors: Ngai Yin Yip, New Haven, CT (US); William Anthony Phillip, New Haven, CT (US); Jessica Deborah Schiffman, New Haven, CT (US); Menachem Elimelech, New Haven, CT (US)

(73) Assignee: Yale University, New Haven, CT (US)

(*) Notice: Subject to any disclaimer, the term of this patent is extended or adjusted under 35 U.S.C. 154(b) by 583 days.

(21) Appl. No.: 13/512,788

(22) PCT Filed: Dec. 3, 2010

(86) PCT No.: PCT/US2010/058863
§ 371 (c)(1),
(2), (4) Date: Jul. 20, 2012

(87) PCT Pub. No.: WO2011/069050
PCT Pub. Date: Jun. 9, 2011

(65) Prior Publication Data
US 2012/0318729 A1    Dec. 20, 2012

Related U.S. Application Data

(60) Provisional application No. 61/266,294, filed on Dec. 3, 2009.

(51) Int. Cl.
*B01D 69/12*    (2006.01)
*B01D 71/56*    (2006.01)
*B01D 61/00*    (2006.01)

(52) U.S. Cl.
CPC ............. *B01D 69/12* (2013.01); *B01D 61/002* (2013.01); *B01D 61/005* (2013.01); *B01D 71/56* (2013.01)

(58) Field of Classification Search
None
See application file for complete search history.

(56) References Cited

U.S. PATENT DOCUMENTS 3,161,574 A    12/1964    Elam
3,228,456 A    1/1966    Brown et al.
(Continued)

FOREIGN PATENT DOCUMENTS

WO    WO-03/047733 A1    6/2003
WO    WO-2006/049663 A1    5/2006
(Continued)

OTHER PUBLICATIONS

International Search Report and Written Opinion from parent PCT application PCT/US2010/058863 dated Feb. 15, 2011.
(Continued)

*Primary Examiner* — Benjamin Kurtz
(74) *Attorney, Agent, or Firm* — McCarter & English, LLP; Danielle L. Herritt; Wei Song

(57) ABSTRACT

One aspect of the invention relates to customized thin-film composite membranes comprising: a porous support; a selective barrier; and one or more polymeric additives dispersed in the porous support in an amount from at least about 1% and about 50% by weight of the porous support. Another aspect of the invention relates to a method of fabricating a porous support comprising the steps of: preparing a polymer solution comprising a polymer, a polymeric additive, and a first liquid; contacting a surface with the polymer solution; and evaporating the liquid. Another aspect of the invention relates to the use of the thin-film composite membranes disclosed herein in osmotically driven membrane processes.

23 Claims, 20 Drawing Sheets

(56) References Cited

U.S. PATENT DOCUMENTS

| | | | |
|---|---|---|---|
| 3,277,959 A | | 10/1966 | Withers |
| 3,537,935 A | | 11/1970 | Withers |
| 3,686,116 A | | 8/1972 | Rio |
| 3,709,841 A | | 1/1973 | Quentin |
| 4,026,977 A | * | 5/1977 | Bourganel ..................... 264/41 |
| 4,174,987 A | | 11/1979 | Belvin et al. |
| 4,216,820 A | | 8/1980 | Andrew |
| 4,411,310 A | | 10/1983 | Perry et al. |
| 4,476,024 A | | 10/1984 | Cheng |
| 4,545,862 A | | 10/1985 | Gore et al. |
| 4,585,523 A | | 4/1986 | Giddings |
| 4,629,563 A | | 12/1986 | Wrasidlo |
| 4,670,146 A | | 6/1987 | Inoue et al. |
| 4,728,394 A | | 3/1988 | Shinjou et al. |
| 4,767,544 A | | 8/1988 | Hamblin |
| 4,842,049 A | | 6/1989 | Dodds |
| 5,160,046 A | | 11/1992 | Pasternak |
| 5,171,445 A | | 12/1992 | Zepf |
| 5,286,280 A | | 2/1994 | Chiou |
| 5,498,278 A | | 3/1996 | Edlund |
| 5,645,626 A | | 7/1997 | Edlund et al. |
| 5,702,503 A | * | 12/1997 | Tse Tang ......................... 95/45 |
| 5,869,174 A | | 2/1999 | Wang |
| 6,131,649 A | | 10/2000 | Pearl et al. |
| 6,165,363 A | | 12/2000 | Oishi et al. |
| 6,409,921 B1 | | 6/2002 | Muller et al. |
| 6,423,205 B1 | | 7/2002 | Akahori et al. |
| 6,486,240 B1 | | 11/2002 | Won et al. |
| 6,547,000 B1 | | 4/2003 | Rantala et al. |
| 6,753,055 B2 | | 6/2004 | Stevens et al. |
| 7,152,670 B2 | | 12/2006 | Dobbs et al. |
| 7,445,712 B2 | | 11/2008 | Herron |
| 7,566,402 B2 | | 7/2009 | Thorsen et al. |
| 7,591,933 B2 | | 9/2009 | Grebenyuk et al. |
| 8,181,794 B2 | | 5/2012 | McGinnis et al. |
| 2005/0006301 A1 | | 1/2005 | Angelini et al. |
| 2005/0011359 A1 | | 1/2005 | Pan et al. |
| 2005/0077243 A1 | | 4/2005 | Pinnau et al. |
| 2006/0043013 A1 | | 3/2006 | Hiro et al. |
| 2006/0226067 A1 | * | 10/2006 | Herron ........................ 210/490 |
| 2007/0251883 A1 | | 11/2007 | Niu |
| 2008/0149561 A1 | | 6/2008 | Chu et al. |
| 2008/0312349 A1 | * | 12/2008 | Yeager et al. .................. 521/27 |
| 2009/0078640 A1 | | 3/2009 | Chu et al. |
| 2010/0285101 A1 | | 11/2010 | Moore et al. |
| 2012/0073795 A1 | | 3/2012 | McGinnis et al. |
| 2014/0054215 A1 | * | 2/2014 | McGinnis et al. ............ 210/490 |

FOREIGN PATENT DOCUMENTS

| | | |
|---|---|---|
| WO | WO-2008/137082 A1 | 11/2008 |
| WO | WO-2011/060202 A1 | 5/2011 |
| WO | WO-2011/069050 A1 | 6/2011 |

OTHER PUBLICATIONS

Achilli, A. et al., "The forward osmosis membrane bioreactor: A low fouling alternative to MBR processes", *Desalination*, 239:10-21 (Elsevier B. V., 2009).

Bamaga, O. A. et al., "Hybrid FO/RO desalination system: Preliminary assessment of osmotic energy recovery and designs of new FO membrane module configurations", *Desalination*, 268:163-169 (Elsevier B. V., 2011).

Chou, S. et al., "Characteristics and potential applications of a novel forward osmosis hollow fiber membrane", *Desalination*, 261:365-372 (Elsevier B. V., 2010).

Ghosh, A. K. et al., "Impacts of support membrane structure and chemistry on polyamide-polysulfone interfacial composite membranes", *Journal of Membrane Science*, 336:140-148 (Elsevier B. V., 2009).

Gray, G. T. et al., "Internal concentration polarization in forward osmosis: role of membrane orientation", *Desalination*, 197:1-8 (Elsevier B. V., 2006).

Lay, W. C. L. et al., "Study of integration of forward osmosis and biological process: Membrane performance under elevated salt environment", *Desalination*, 283:123-130 (Elsevier B. V., 2011).

Lee, S. et al., "Comparison of fouling behavior in forward osmosis (FO) and reverse osmosis (RO)", *Journal of Membrane Science*, 365:34-39 (Elsevier B. V., 2010).

Loeb, S. et al., "Effect of porous support fabric on osmosis through a Loeb-Sourirajan type asymmetric membrane", *Journal of Membrane Science*, 129:243-249 (Elsevier Science B. V., 1997).

McCutcheon, J. R. et al., "Influence of concentrative and dilutive internal concentration polarization on flux behavior in forward osmosis", *Journal of Membrane Science*, 284:237-247 (Elsevier B. V., 2006).

McCutcheon, J. R. et al., "Influence of membrane support layer hydrophobicity on water flux in osmotically driven membrane processes", *Journal of Membrane Science*, 318:458-466 (Elsevier B. V., 2008).

Mehta, G. D., "Further Results on the Performance of Present-Day Osmotic Membranes in Various Osmotic Regions", *Journal of Membrane Science*, 10:3-19 (Elsevier Science, 1982).

Mehta, G. D. et al., "Internal Polarization in the Porous Substructure of a Semipermeable Membrane Under Pressure-Retarded Osmosis", *Journal of Membrane Science*, 4:261-265 (Elsevier Scientific Publishing Co., Netherlands, 1978).

Mehta, G. D. et al., "Performance of PermaSEP B-9 and B-10 Membranes in Various Osmotic Regions and At High Osmotic Pressures", *Journal of Membrane Science*, 4:335-349 (Elsevier Scientific Publishing Co., Netherlands, 1979).

Ng, H. Y. et al., "Performance of Forward (Direct) Osmosis Process: Membrane Structure and Transport Phenomenon", *Environ. Sci. Technol.*, 40(7):2408-2413 (American Chemical Society, USA, 2008).

Siaram, M. et al., "Method for the preparation of cellulose acetate flat sheet composite membranes for forward osmosis—Desalination using $MgSO_4$ draw solution", *Desalination*, 273:299-307 (Elsevier B. V., 2011).

Tang, C. Y. et al., "Modeling double-skinned FO membranes", *Desalination*, 283:178-186 (Elsevier B.V., 2011).

Tang, W. et al., "Concentration of brine by forward osmosis: Performance and influence of membrane structure", *Desalination*, 224:143-153 (Elsevier B. V., 2008).

Yip, N. Y. et al., "Thin-Film Composite Pressure Retarded Osmosis Membranes for Sustainable Power Generation from Salinity Gradients", *Environ. Sci. Technol.*, 45:4360-4369 (American Chemical Society, USA, 2011).

\* cited by examiner surface cross-section

A                                B

HIGH FLUX THIN-FILM COMPOSITE FORWARD OSMOSIS AND PRESSURE-RETARDED OSMOSIS MEMBRANES

RELATED APPLICATIONS

This application is the U.S. national phase of international patent application Serial No. PCT/US2010/058863, filed Dec. 3, 2010, which claims the benefit of priority to U.S. Provisional Patent Application Ser. No. 61/266,294, filed Dec. 3, 2009.

GOVERNMENT SUPPORT

This invention was made with government support under Grant No. 0120978 awarded by the National Science Foundation. The Government has certain rights in the invention.

BACKGROUND

Osmotically driven membrane processes, such as forward osmosis (FO) and pressure-retarded osmosis (PRO), rely on large osmotic pressure differentials across semi-permeable membranes to generate water flux, while retaining solutes on either side of the semi-permeable membrane.

Polymeric membranes currently used in liquid separations are thin-film composite (TFC) membranes. TFC membranes are typically comprised of a selective barrier, which sits on top of a porous structure called the support layer or porous support. In typical pressure-driven membrane processes, the driving force for water flux is the hydraulic pressure applied across the membrane. The water permeability of the selective barrier is much greater than the barrier's permeability to the solute; hence, the solute is rejected by the membrane. The porous support merely provides mechanical and structural support for the selective layer in pressure driven membrane separation processes, and plays no apparent role in the actual separation process.

Osmotically driven membrane processes make use of the osmotic pressure difference created by a concentrated draw solution to drive water across a selective barrier (e.g., a semi-permeable thin polymeric film). To achieve ideal performance in osmotically driven membrane processes, certain membrane characteristics need to be customized (see International Patent Application No. PCT/US08/005696, hereby incorporated by reference in its entirety). There exists a need for membranes, which are customized to optimize osmotically driven membrane processes.

SUMMARY

One aspect of the invention relates to customized thin-film composite membranes comprising: a porous support; a selective barrier; and one or more polymeric additives dispersed in the porous support in an amount from about 1% and about 50% by weight of the porous support.

Another aspect of the invention relates to a method of fabricating a porous support comprising the steps of: preparing a polymer solution comprising a polymer, a polymeric additive, and a first liquid; contacting a surface with the polymer solution; and evaporating the liquid.

Another aspect of the invention relates to the use of the thin-film composite membranes disclosed herein in osmotically driven membrane processes, such as desalination of seawater and brackish water; purification and reuse of wastewater; reactions run in forward osmosis (FO) or pressure-retarded osmosis (PRO) bioreactors; concentration/dewatering of liquid foods; concentration of pharmaceuticals; energy generation through pressure-retarded osmosis; energy generation through osmotic heat engine; as well as other applications which exploit osmotically driven membrane processes.

Additional advantages are set forth in the description and figures which follow, and will be understood from the description by a person having ordinary skill in the art, and/or can be learned by practice of the methods and apparatus disclosed herein. It is to be understood that both the foregoing general description and the following detailed description are exemplary and explanatory only and are not restrictive of the invention, the scope of which can be determined from the Detailed Description and the claims attached hereto.

DETAILED DESCRIPTION

Figure 1:
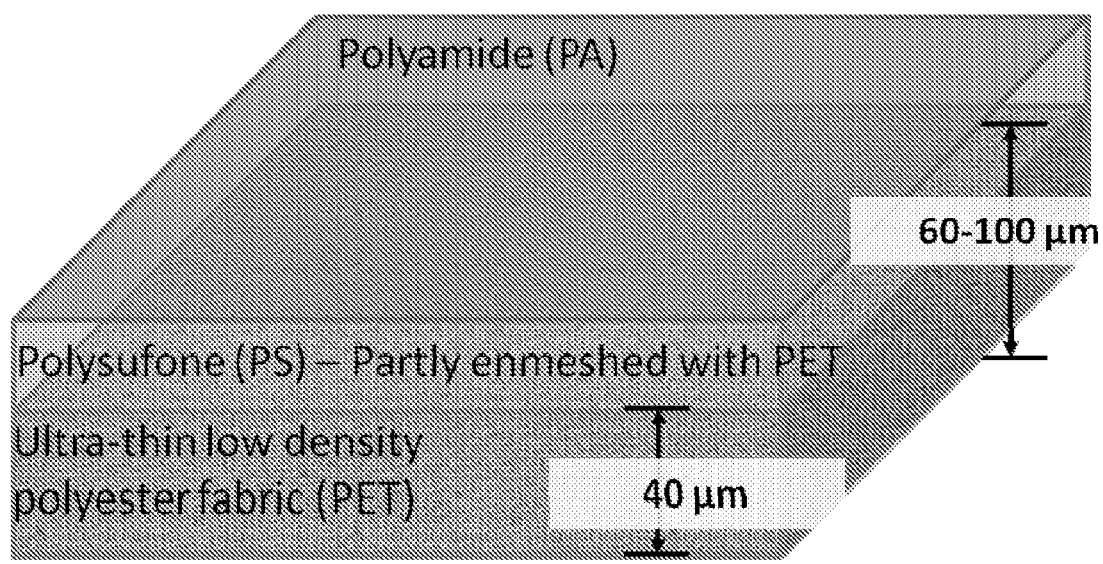
FIG. 1 depicts an exemplary membrane of the invention.
Figure 2:
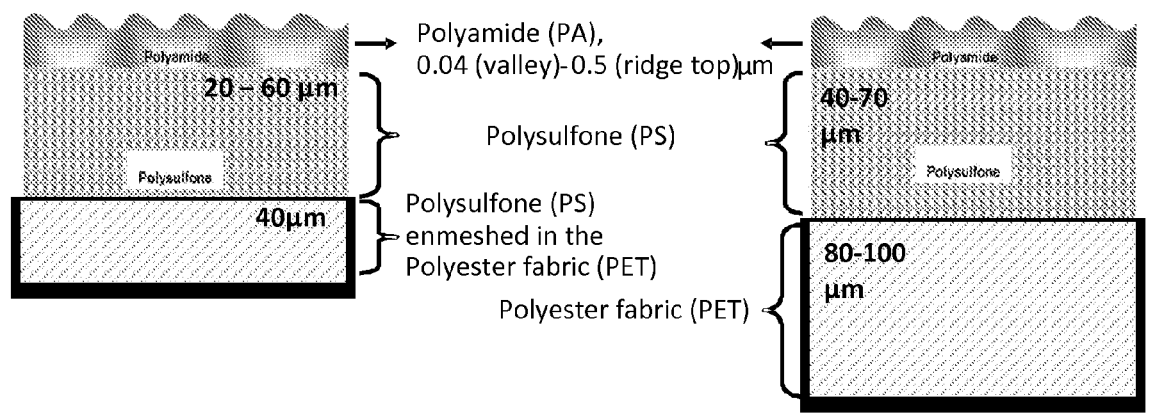
FIG. 2 depicts a comparison between an example of a membrane of the invention (left), and a commercial membrane (right). The membrane of the invention shown has an ultra-thin separating barrier layer supported on a chemically different asymmetric porous substrate, allowing the benefits of two separate polymeric layers to be combined, while a polyester fabric is used as a structural support.
Figure 3:
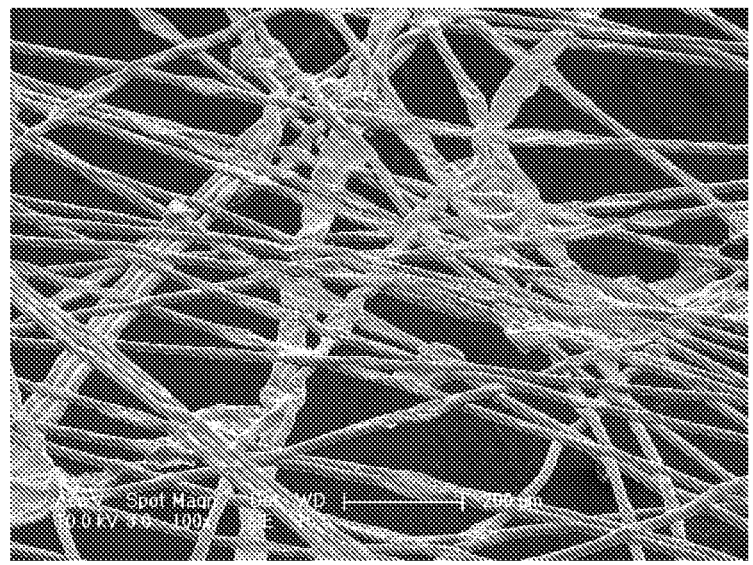
FIG. 3 depicts micrographs of the surface and cross-section of a polyester fabric (PET). The polyester shown has a thickness of about 40 µm and basis weight of about 15.1 g/m$^2$. The polyester shown has a permeability of about 4520 L/m$^2$/sec; tensile strength of about 700.5 N/m machine direction (MD); and 437.8 N/m cross direction (CD).
Figure 3:
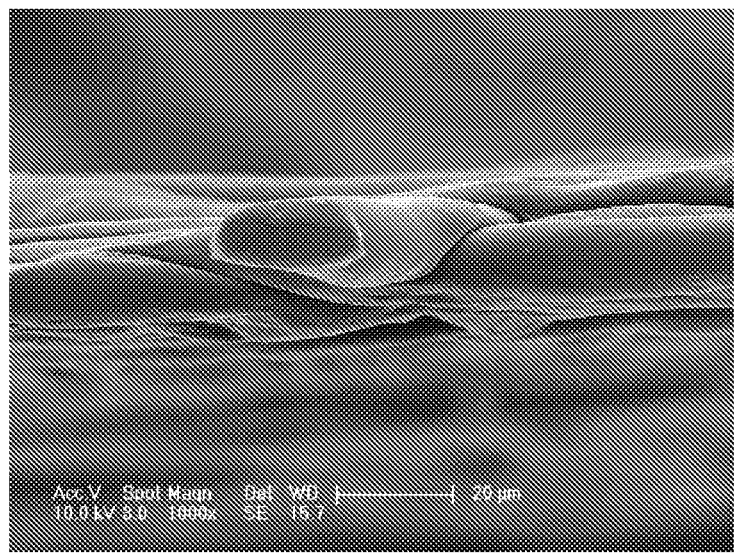
Figure 4:
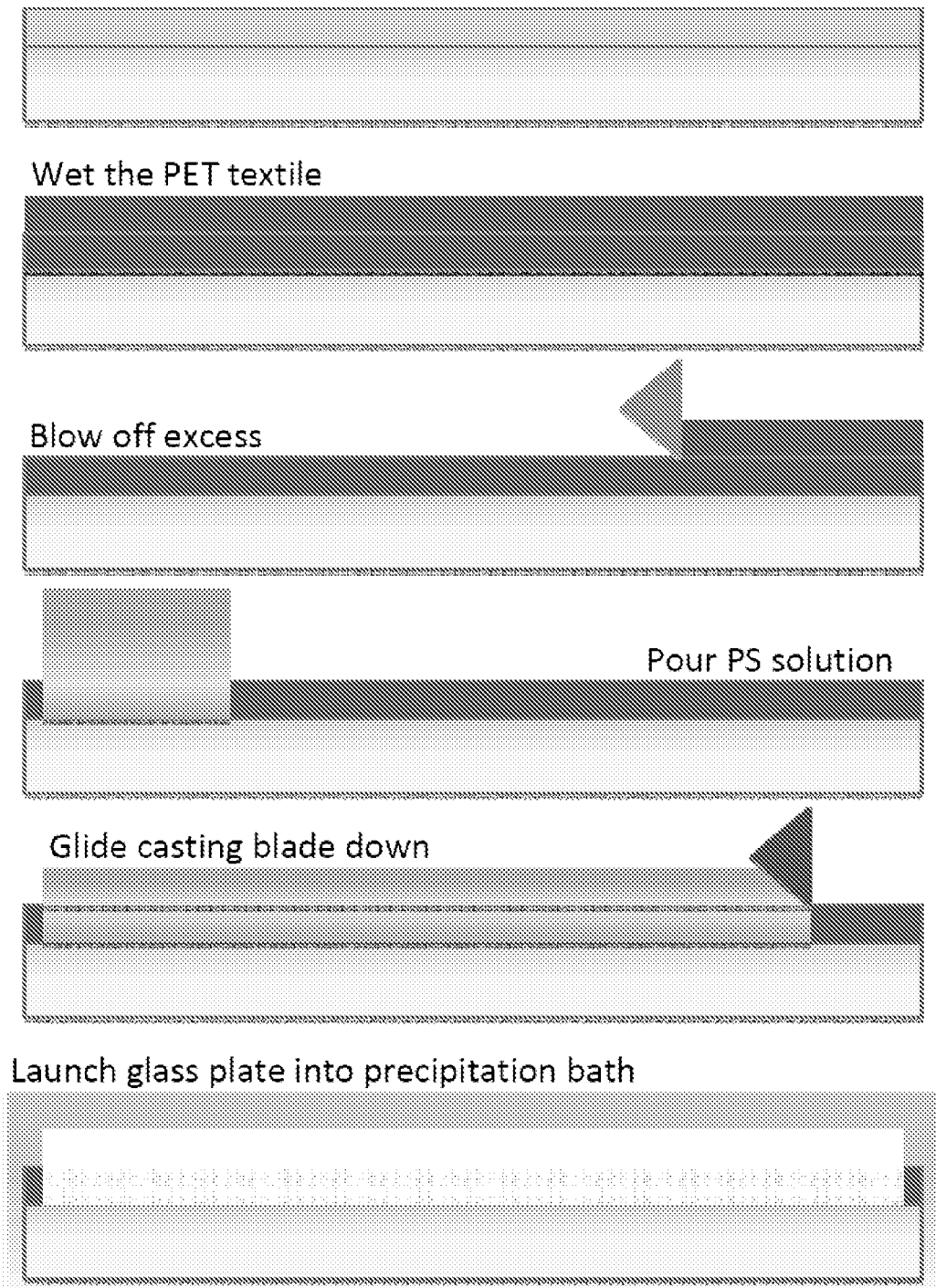
FIG. 4 depicts graphically selected steps in a method of TFC casting a polysulfone (PS) layer by phase inversion. For example, a polyester fabric (40 to 60 µm thick, 15 to 20 g/m$^2$) is secured to a clean, impermeable surface. The polyester fabric is wetted with a solvent or solvent mixture. The excess solvent is removed using an air-knife. About 12 and about 25 wt % PS casting solution is drawn across the polyester fabric in one smooth motion. The impermeable plate is immersed into a precipitation bath and transferred to deionized (DI) water bath after about 10 min. After which, the membrane is transferred to fresh DI water and stored in a refrigerator.
Figure 5:
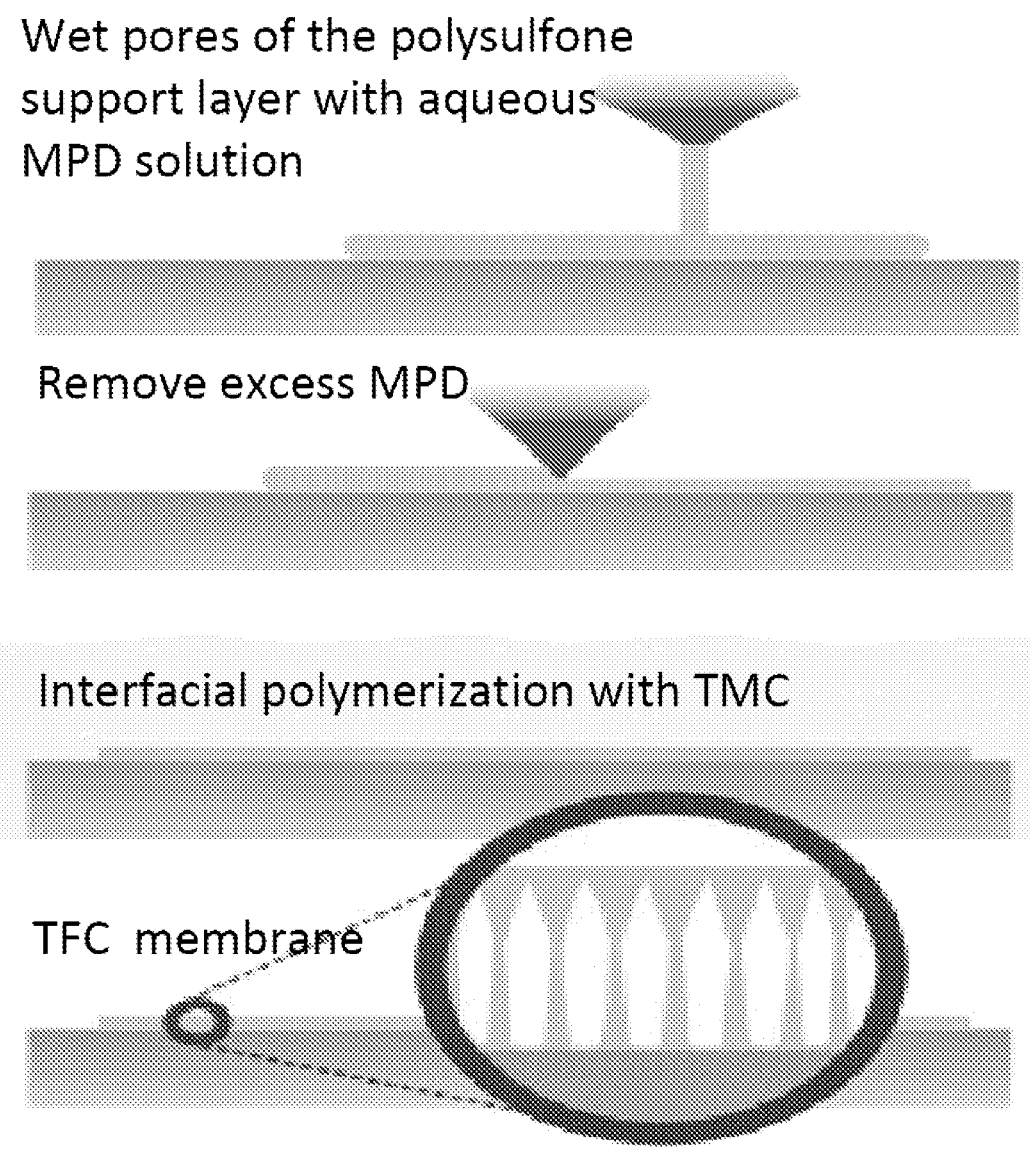
FIG. 5 depicts graphically selected steps in a method of TFC casting a polyamide (PA) layer by interfacial polymerization. The pores of a polysulfone support layer are wetted with a MPD solution, 3.4% (wt/wt), for about 2 min. Excess MPD is removed. A TMC solution, 0.15% (wt/wt), is added for about 1 min, followed by a vertical hold for about 2 min and a cure at 95° C. for about 2 min. The resulting material is treated with a NaOCl solution for about 2 min, a NaHSO$_3$ solution for about 30 sec. A final cure at 95° C. for about 2 min completes the process. MPD is metaphenylene diamine; and TMC is trimesoyl chloride (1,3,5-benzenetricarbonyl trichloride). See U.S. Pat. No. 4,277,344; hereby incorporated by reference in its entirety.
Figure 6:
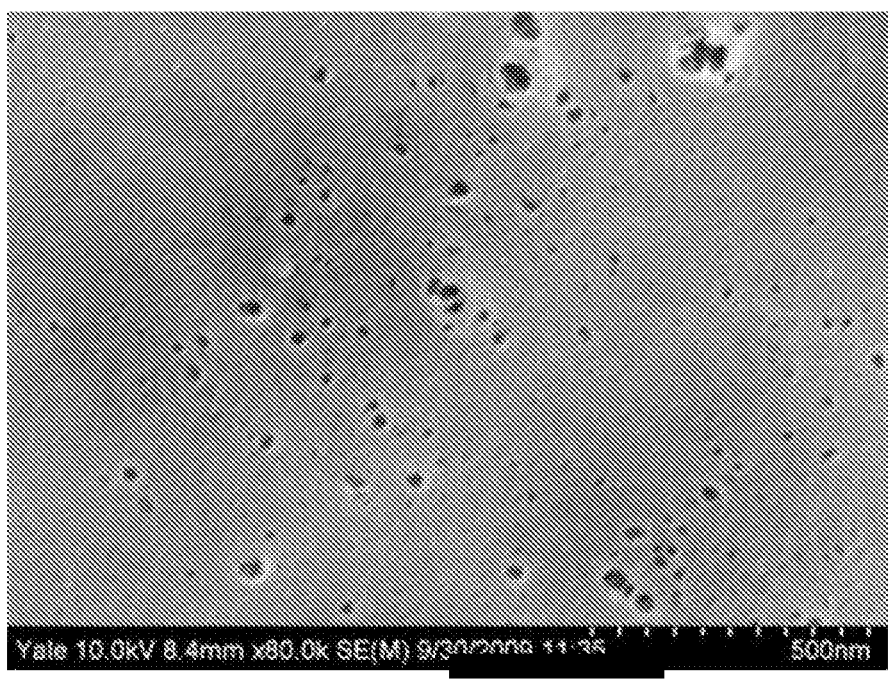
FIG. 6 depicts electron micrographs of a fabricated support polysulfone layer (active side) before polyamide casting (different magnifications of the active side).
Figure 6:
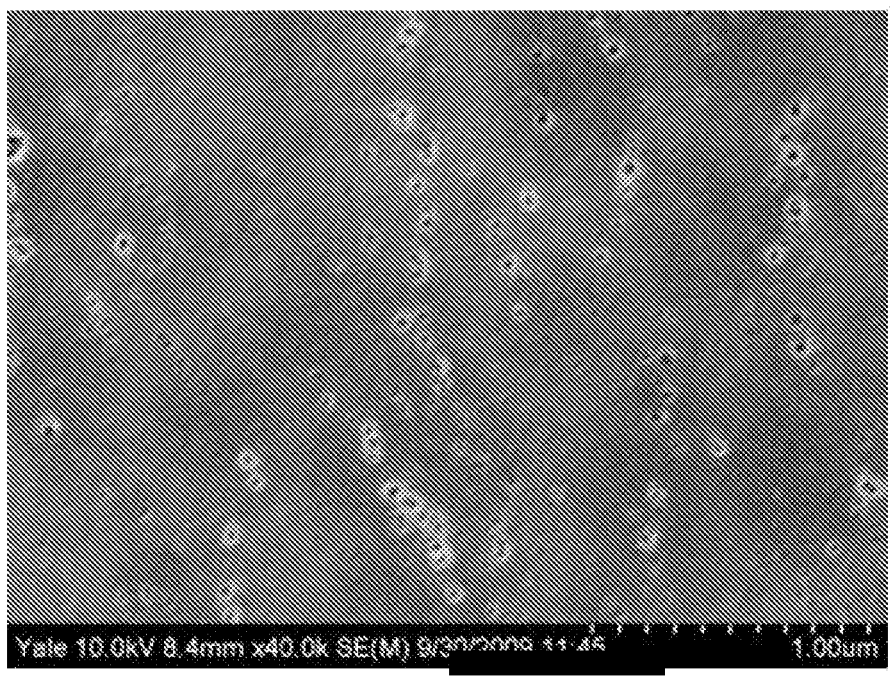
Figure 7:
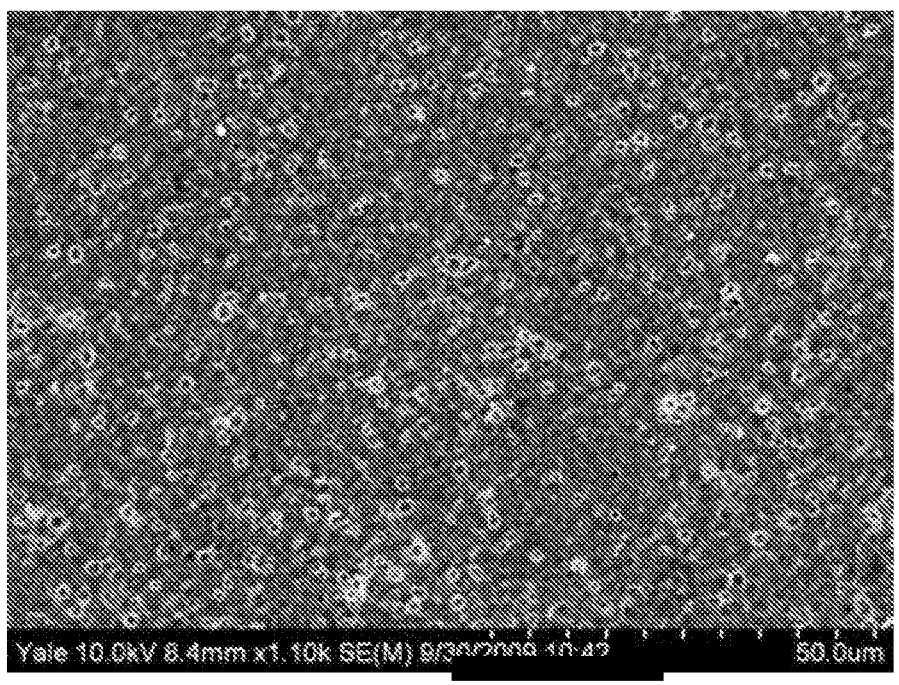
FIG. 7 depicts electron micrographs of a fabricated polysulfone layer (support side), i.e., polysulfone enmeshed in polyester fabric (different magnifications of the support side).
Figure 7:
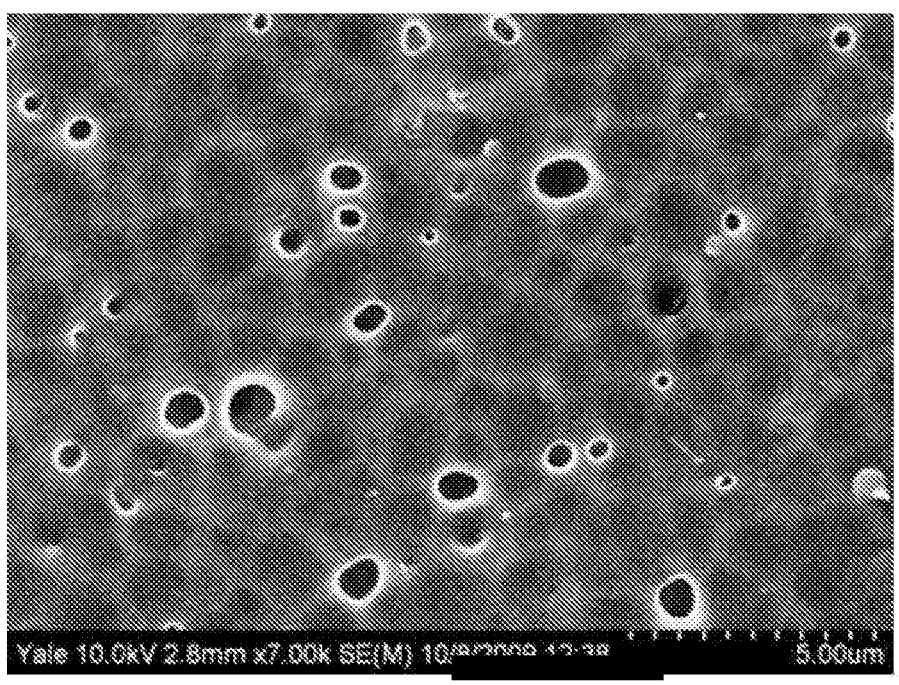

Osmotically driven membrane processes, such as forward osmosis (FO) and pressure-retarded osmosis (PRO), rely on large osmotic pressure differentials across semi-permeable membranes to generate water flux, while retaining solutes on either side of the semi-permeable membrane. Membranes useful for osmotically driven processes include thin-film composite (TFC) membranes. A thin-film composite membrane typically comprises a porous support and a selective barrier polymerized thereon. A thin-film composite membrane may further comprise a backing layer, upon which the porous support is cast. A variety of membrane shapes are useful and can be provided using the disclosed methods and techniques; these include plate and frame, spiral wound, hollow fiber, tubular, or flat sheet type membranes.

In certain embodiments, the disclosed thin-film composite membranes are semi-permeable membranes. That is, the membranes may be prepared so as to be substantially permeable to a liquid (e.g., water) and substantially impermeable to solutes, for example, by properly preparing the selective barrier. As used herein, "solutes" generally refers to materials dissolved, dispersed, or suspended in a liquid. The solutes can be undesirable; in such cases, the membranes can be used to remove the undesired solutes from the liquid, thereby purifying the liquid, and the liquid can be subsequently collected. The solutes can be desirable; in such cases, the membranes can be used to decrease the volume of the liquid, thereby concentrating the solutes, and the solutes can be subsequently collected.

Polymeric membranes currently available are not ideal for osmotically driven membrane processes without painstaking modification of various membrane characteristics. For example, support layer porosity, thickness, tortuosity, and hydrophilicity all play a crucial role in water flux performance across asymmetric semi-permeable membranes.

Indeed, membrane support layers must be thin, highly porous, non-tortuous, and/or hydrophilic if they are to be used in FO and PRO processes. Moreover, these numerous goals must be achieved without sacrificing water permeability and salt rejection.

Selective Barriers

The selective barrier in the disclosed thin-film composite membranes may be a semi-permeable three-dimensional polymer network, such as an aliphatic or aromatic polyamide, aromatic polyhydrazide, poly-bensimidazolone, polyepiamine/amide, polyepiamine/urea, poly-ethyleneimine/urea, sulfonated polyfurane, polybenzimidazole, polypiperazine isophtalamide, a polyether, a polyether-urea, a polyester, or a polyimide or a copolymer thereof or a mixture of any of them. In certain embodiments, the selective barrier may be an aromatic or non-aromatic polyamide, such as residues of a phthaloyl (e.g., isophthaloyl or terephthaloyl) halide, a trimesyl halide, or a mixture thereof. In another example, the polyamide may be residues of diaminobenzene, triaminobenzene, polyetherimine, piperazine or poly-piperazine or residues of a trimesoyl halide and residues of a diaminobenzene. The selective barrier may also comprise residues of trimesoyl chloride and m-phenylenediamine. Further, the selective barrier may be the reaction product of trimesoyl chloride and m-phenylenediamine.

In certain embodiments, the selective barrier may have an average thickness from about 20 nm and about 1,000 nm. For example, the selective barrier may have an average thickness from about 20 nm and about 100 nm, from about 100 nm and about 200 nm, from about 200 nm and about 300 nm, from about 300 nm and about 400 nm, from about 400 nm and about 500 nm, from about 500 nm and about 600 nm, from about 600 nm and about 700 nm, from about 700 nm and about 800 nm, from about 800 nm and about 900 nm, or from about 900 nm and about 1,000 nm.

The selective barrier may be formed on the surface of a porous support via polymerization, for example, via interfacial polymerization. See, for example, U.S. Pat. No. 6,562,266 (incorporated by reference); Cadotte J. E. (1981), U.S. Pat. Nos. 4,259,183 and 4,277,344 (both incorporated by reference); Cadotte, J. E., King, R. S., Majerle, R. J. and Petersen, R. J. (1981) 'Interfacial Synthesis in the Preparation of Reverse Osmosis Membranes', Journal of Macromolecular Science, Part A, 15:5, 727-755, and Baker, Richard W. (2004) "Membrane Technology and Applications, Second Edition," John Wiley & Sons, Ltd.

Composite polyamide membranes are typically prepared by coating a porous polymeric (e.g., polysulfone) support structure with a polyfunctional amine monomer, typically coated from an aqueous solution. Although water is a workable solvent, non-aqueous solvents can also be utilized, such as acetonitrile and dimethylformamide (DMF). A polyfunctional acyl halide monomer (also referred to as acid halide) is subsequently coated on the support, typically from an organic solution. The amine solution is typically coated first on the porous support followed by the acyl halide solution. The monomers can react when in contact, thereby polymerizing to produce a polymer (e.g., polyamide) film at the surface of the support structure. Although one or both of the polyfunctional amine and acyl halide can be applied to the porous support from a solution, they can also be applied by other means, such as by vapor deposition.

Suitable monomers for forming a polyamide include m-phenylenediamine (1,3-diaminobenzene or "MPD") and trimesoyl chloride ("TMC"). The reaction can be carried out at room temperature in an open environment, but the temperature of either the polar or the apolar liquid or both can be controlled. Once formed, the dense polymer layer can act as a barrier to inhibit the contact between reactants and to slow down the reaction; hence, the resulting selective dense layer is typically thin and permeable to water, but relatively impermeable to dissolved, dispersed, or suspended solids.

Generally, the selective barrier may be prepared by reaction of two or more monomers. In one embodiment, the first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. In one embodiment, the first and second monomers can be chosen so as to be capable of undergoing an interfacial polymerization reaction to form a selective barrier (i.e., a three-dimensional polymer network) when brought into contact. In a further aspect, the first and second monomers can be chosen so as to be capable of undergoing a polymerization reaction when brought into contact to form a polymer product that is capable of subsequent crosslinking by, for example, exposure to heat, light radiation, or a chemical crosslinking agent.

In one embodiment, a first monomer can be selected so as to be miscible with a polar liquid and, with the polar liquid, can form a polar mixture. In a further embodiment, the first monomer can be selected so as to be miscible with an apolar liquid. The first monomer can optionally also be selected so as to be immiscible with an apolar liquid. Typically, the first monomer can be a dinucleophilic or a polynucleophilic monomer. In a further embodiment, the first monomer can be a diaminobenzene. For example, the first monomer can be m-phenylenediamine. As a further example, the first monomer can be a triaminobenzene. In a yet further embodiment, the polar liquid and the first monomer can be the same compound; that is, the first monomer can be provided neat and not dissolved in a separate polar liquid.

In one embodiment, a second monomer can be selected so as to be miscible with an apolar liquid and, with the apolar liquid, can form an apolar mixture. The second monomer can optionally also be selected so as to be immiscible with a polar liquid. Typically, the second monomer can be a dielectrophilic or a polyelectrophilic monomer. In a further aspect, the second monomer can be a trimesoyl halide. For example, the second monomer can be trimesoyl chloride. As a further example, the second monomer can be a phthaloyl halide. In a yet further embodiment, the apolar liquid and the second monomer can be the same compound; that is, the second monomer can provided and not dissolved in a separate apolar liquid.

Generally, the difunctional or polyfunctional nucleophilic monomer can have primary or secondary amino groups and can be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of suitable amine species include primary aromatic amines having two or three amino groups, for example, m-phenylene diamine, and secondary aliphatic amines having two amino groups, for example, piperazine. The amine can typically be applied to the microporous support as a solution in a polar liquid, for example water. The resulting polar mixture typically includes an amine in about 0.1 and about 10 weight percent, for example from about 0.5 and about 6 weight percent, about 0.1 and about 2 weight percent, about 2 and about 4 weight percent, about 4 and about 6 weight percent, about 6 and about 8 weight percent, or about 8 and about 10 weight percent. Once coated on a porous support, excess polar mixture can be optionally removed.

Generally, difunctional or polyfunctional electrophilic monomer is coated from an apolar liquid, although the monomer can be optionally delivered from a vapor phase (for monomers having sufficient vapor pressure). The electrophilic monomer can be aromatic in nature and can contain two or more, for example three, electrophilic groups per molecule. In the case of acyl halide electrophilic monomers, because of the relatively lower cost and greater availability, acyl chlorides are generally more suitable than the corresponding bromides or iodides. A suitable polyfunctional acyl halide is trimesoyl chloride (TMC). The polyfunctional acyl halide can be dissolved in an apolar organic liquid in a range of, for example, from about 0.01 to about 10.0 weight percent, from about 0.05 to about 3 weight percent, or about 3.4 weight percent, and delivered as part of a continuous coating operation. Suitable apolar liquids are those which are capable of dissolving the electrophilic monomers, for example polyfunctional acyl halides, and which are immiscible with a polar liquid, for example water. Suitable polar and apolar liquids can include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C., such as $C_8$-$C_{24}$ hydrocarbons and mixtures thereof, have more suitable flashpoints than their $C_5$-$C_7$ counterparts.

Once brought into contact with one another, the electrophilic monomer and nucleophilic monomer react at the surface interface between the polar mixture and the apolar mixture to form a polymer, for example polyamide, discriminating layer. The reaction time is typically less than one second, but contact time is often longer, for example from one to sixty seconds, after which excess liquid can optionally be removed, e.g., by way of an air knife, water bath(s), dryer, and the like. The removal of the excess polar mixture and/or apolar mixture can be conveniently achieved by drying at elevated temperatures, e.g., from about 40° C. and about 120° C., although air drying at ambient temperatures can be used.

Through routine experimentation, those skilled in the art will appreciate the optimum concentration of the monomers, given the specific nature and concentration of the other monomer, reaction conditions, and desired membrane performance.

Porous Supports

Polymers that may be suitable for use as porous supports in accordance with the present invention include polysulfone, polyethersulfone, poly(ether sulfone ketone), poly(ether ethyl ketone), poly(phthalazinone ether sulfone ketone), polyacrylonitrile, polypropylene, poly(vinyl fluoride), polyetherimide, cellulose acetate, cellulose diacetate, and cellulose triacetate polyacrylonitrile.

In certain embodiments, the polymer support may have an average thickness from about 5 µm and about 500 µm. For example, the polymer support may have an average thickness from about 5 µm and about 100 µm, from about 40 µm and about 70 µm, from about 100 µm and about 200 µm, from about 200 µm and about 300 µm, from about 300 µm and about 400 µm, or from about 400 µm and about 500 µm.

In certain embodiments, the porous support comprises a first side (active side) with a first plurality of pores, and a second side (support side) with a second plurality of pores.

In certain embodiments, the average diameter of substantially all of the first plurality of pores is between about 0.1 nm and about 100 nm, about 1 nm and about 25 nm, about 1 nm and about 50 nm, about 10 nm and about 25 nm, about 25 nm and about 50 nm, about 50 nm and about 75 nm, or about 75 nm and about 100 nm.

In certain embodiments, the average diameter of substantially all of the second plurality of pores is between about 100 nm and about 5,000 nm, about 150 nm and about 5,000 nm, about 300 nm and about 3,000 nm, about 1,000 nm and about 5,000 nm, about 1,000 nm and about 4,000 nm, about 1,000 nm and about 3,000 nm, about 1,000 nm and about 2,000 nm, about 2,000 nm and about 3,000 nm, or about 4,000 nm and about 5,000 nm.

In certain embodiments, the first plurality of pores and the second plurality of pores are fluidly connected to each other.

In one embodiment, polymeric additives are dispersed within the porous support. (For an example of polymer supports with microparticles and nanoparticles dispersed therein, see U.S. Pat. App. No. 2008/0237126, which is hereby incorporated by reference in its entirety.) The use of additives in the polymer support influences the structure and morphology of the polymer support layer, allows for customization of the polymer support to achieve high porosity, hydrophilicity, and low tortuosity throughout the structure for favorable water flux in osmotically driven membrane processes, and allows for customization of the top surface of the porous support to achieve desired pore size distribution, surface roughness and hydrophobicity/hydrophilicity, for favorable formation of a selective barrier layer.

In certain embodiments, the polymeric additives are selected from the group consisting of polyalkylene glycols (such as polyethylene glycol), polyalkylene oxides (such as polyethylene oxide), polyoxoalkylenes (such as polyoxoethylene), acrylamides, catecholamines (such as dopamine) and polyetheramines (such as Jeffamine®).

In certain embodiments, a mixture of a main solvent and one or more co-solvents can be used to prepare the polymer support. The use of a main solvent and co-solvent(s) in the polymer solution can influence the structure and morphology of the porous support layer. In certain embodiments, the use of a mixture of solvents can result in the active side of the porous support having a sponge-like porous structure and the support side of the porous support has a finger-like porous structure.

In certain embodiments, the ratio of main solvent to co-solvent ranges from about 100:0 and about 50:50. For example, the ratio of main solvent to co-solvent can be about 95:5, about 90:10, about 80:20, about 75:25, about 70:30, about 60:40, or about 50:50. In certain embodiments, the main solvent and co-solvent(s) used are selected from the group consisting of 1-methyl-2-pyrrolidinone (NMP), N,N-dimethylformamide (DMF), dimethyl sulfoxide (DMSO), triethyl phosphate, and dimethyl acetamide.

In certain embodiments, the main solvent is NMP; and the co-solvent is DMF. In certain embodiments, the main solvent is NMP; the co-solvent is DMF; and the ratio of solvent to co-solvent is about 75:25. In certain embodiments, the main solvent is NMP; the co-solvent is DMF; and the ratio of solvent to co-solvent is about 50:50.

In certain embodiments, the porous support can be formed by dispersion casting. Preparation of a porous support by dispersion casting (alternatively, immersion-precipitation or non-solvent-induced phase inversion) can be accomplished by pouring an aliquot of the polymer-additive(s)-solvent(s) solution onto a surface and removing the solvent(s). In certain embodiments, the surface may be a fabric layer or a smooth flat surface. Increased temperature and/or reduced pressure can facilitate removal. In certain embodiments, the solution is desiccated for about 5 hours and about 20 hours prior to dispersion casting.

In certain embodiments, the amount of polymer (e.g., in the form of a resin) and additives added to the solvent or solvents is between about 5 and about 50% (wt/wt) of the solution. For example, the amount of polymer and additive in a dispersion casting solution can be between about 10 and about 50% (wt/wt), about 10 and about 40% (wt/wt), between about 10 and about 30% (wt/wt), or between about 12 and about 25% (wt/wt).

In certain embodiments, an even film of the polymer solution is spread onto the surface by a casting knife. In certain embodiments, the height of the casting knife ranges from about 10 µm and about 300 µm. For example, the casting height may be from about 10 µm and about 50 µm, about 50 µm and about 100 um, from about 100 µm and about 150 µm, about 150 µm and about 200 µm, about 200 µm and about 250 µm, or about 250 µm and about 300 µm. In certain embodiments, a low casting height is desirable to achieve a thin porous support layer in order to enhance water flux in osmotically driven membrane processes.

In certain embodiments, the even film of the polymer solution is immersed in a precipitation bath of deionized water (DI) for a period of about 5 min to about 30 min. For example, the period can be about 5 min to about 10 min, about 10 min to about 15 min, about 15 min to about 20 min, about 20 min to about 25 min, or about 25 min to about 30 min.

The structure, morphology, and properties of the precipitated polymer porous layer vary according to the dispersion kinetics of the solvents in the polymer solution into the non-solvent DI in the precipitation bath. Solvents have individual rates of dispersion: varying these main solvents as well as the main solvent to co-solvent ratio will affect the porous support structure. The porous support can be customized to possess the desired pore size distribution, surface roughness, hydrophobicity/hydrophilicity on the top surface for favorable formation of the selective barrier layer, and high porosity, hydrophilicity, and low tortuosity throughout the structure for favorable water flux in osmotically driven membrane processes. The structure and characteristics of the porous support is also affected by properties of the solution additive.

In certain embodiments, the use of solvent, additives and/or salts in the precipitation bath can be used to influence the structure and morphology of the porous support layer, allowing customization the polymer support to achieve high porosity and hydrophilicity, and low tortuosity throughout the structure for favorable water flux in osmotically driven membrane processes, and customization of the top surface of the polymer support to achieve desired pore size distribution, surface roughness and hydrophobicity/hydrophilicity for favorable formation of a selective barrier layer.

In certain embodiments, the precipitation bath contains up to about 10% (wt/wt) of a solvent, such as NMP, DMF, DMSO, triethyl phosphate, dimethyl acetamide or combinations thereof; of additives, such as sodium docecyl sulfate; and/or of other salts to further influence the structure of the porous support. Because the composition of the precipitation bath influences the rate of solvent dispersion into the precipitation bath, it consequently affects the structure and morphology of the porous support.

Backing Layers

The polymer support may be formed on top of a backing layer to confer overall mechanical and handling strength to the membrane. The backing layer, if utilized, should be thin, in order to minimize the related added resistance to mass transfer. The backing layer is of a lower material density and thickness than what is commonly used in the fabrication of reverse osmosis membranes. The lower material density backing layer yields a more open and porous membrane matrix at the bottom. With thinner backing layers, one is able to fabricate overall thinner membranes. In certain embodiments, the backing layer can be a woven or non-woven fabric, composed of polyester or other polymers or combinations of polymers.

In certain embodiments, the backing layer has a contact angle of less than about 50 degrees, about 40 degrees, about 30 degrees, about 20 degrees, or about 10 degrees, which improves the wettability and enhances the overall membrane water flux performance.

In certain embodiments, the basis weight of the backing layer is between about 10 g/m$^2$ and about 50 g/m$^2$, about 10 g/m$^2$ and about 40 g/m$^2$, about 10 g/m$^2$ and about 30 g/m$^2$, or about 20 g/m$^2$ and about 30 g/m$^2$.

In certain embodiments, the average thickness of the backing layer is between about 5 μm and about 100 μm, about 10 μm and about 60 μm, about 5 μm and about 10 μm, about 10 μm and about 15 μm, about 15 μm and about 20 μm, about 20 μm and about 25 μm, about 25 μm and about 30 μm, about 30 μm and about 35 μm, about 35 μm and about 40 μm, about 40 μm and about 45 μm, about 45 μm and about 50 μm, about 50 μm and about 55 μm, or about 55 μm and about 60 μm.

In certain embodiments, if the polymer support is cast onto a fabric layer, the fabric is pre-wetted with a solvent such as NMP, DMF, DMSO, triethyl phosphate, dimethyl acetamide, or a combination thereof. Wetting the fabric backing layer with a solvent or solvent mixture dilutes the polymer solution at the bottom of the membrane, resulting in a lower polymer concentration. In addition, the presence of a solvent, or solvent mixture, avoids contact between the polymer solution and the underlying flat surface, thus facilitating the diffusion of the solvent. The resulting membrane matrix at the bottom (interface between the polymer support layer and the backing layer) is more open and porous compared to the top (interface between the polymer support layer and the selective barrier).

Pre-wetting of the fabric layer creates a solvent-solvent interface (instead of a solvent-non-solvent interface) at the bottom of the membrane during polymer precipitation. This step confers increased porosity and decreased tortuosity at the bottom of the support layer, a feature advantageous for water flux performance in osmotically driven membrane processes. Additives to the wetting solvent increase the hydrophilicity of the bottom of the support layer, further enhancing the water flux performance of the membrane. If the polymer solution is casted onto an unwetted fabric fabric, air entrapped within the fabric would cause pinhole defects in the porous layer during precipitation of the polymer. Therefore, pre-wetting of the fabric has another benefit—air that causes defects within the porous support layer is driven out from the fabric layer and the occurrence of pinhole defects is minimized.

In certain embodiments, additives such as polyalkylene glycols (such as polyethylene glycol), polyalkylene oxides (such as polyethylene oxide), polyoxoalkylenes (such as polyoxoethylene), acrylamides, catecholamines (such as dopamine) polyetheramines (such as Jeffamine®), or combinations thereof, may be added to the wetting solvent. In certain embodiments, the additives may be added to the wetting solvent in a concentration of about 0.01 to about 50% (wt/wt), about 0.01 to about 1% (wt/wt), about 1 to about 10% (wt/wt), about 10 to about 20% (wt/wt), about 20 to about 30% (wt/wt), about 30 to about 40% (wt/wt), or about 40 to about 50% (wt/wt).

Methods of Using the Membranes

In certain aspects, the membranes disclosed herein can be employed in a method of purifying or separating various liquids, such as water. Such a method may comprise exposing the selective barrier side of the membrane to a water solution (e.g., salt water solution); and collecting purified water on the other side of the membrane. Such TFC membranes may be used in processes such as desalination of seawater and brackish water; purification and reuse of wastewater; reactions run in forward osmosis membrane or pressure-retarded osmosis bioreactors; concentration/dewatering of liquid foods; concentration of pharmaceuticals; energy generation through pressure-retarded osmosis; energy generation through osmotic heat engine; as well as other application which utilizes the principle of osmotically driven membrane processes.

Selected Membranes

One aspect of the invention relates to a thin-film composite membrane, comprising:

a porous support comprising a first side with a first plurality of pores, and a second side with a second plurality of pores, wherein the average diameter of substantially all of the first plurality of pores is between about 0.1 nm and about 100 nm, and the average diameter of substantially all of the second plurality of pores is between about 150 nm and about 5,000 nm;

a polymeric additive dispersed in the porous support in an amount from about 1% to about 50% by weight of the porous support; and a semi-permeable selective barrier on the first side of the porous support.

In certain embodiments, the present invention relates to any one of the aforementioned membranes, wherein the porous support comprises polysulfone, polyethersulfone, poly(ether sulfone ketone), poly(ether ethyl ketone), poly(phthalazinone ether sulfone ketone), polyacrylonitrile, polypropylene, poly(vinyl fluoride), polyetherimide, cellulose acetate, cellulose diacetate, or cellulose triacetate.

In certain embodiments, the present invention relates to any one of the aforementioned membranes, wherein the average diameter of substantially all of the first plurality of pores is between about 1 nm and about 50 nm.

In certain embodiments, the present invention relates to any one of the aforementioned membranes, wherein the average diameter of substantially all of the first plurality of pores is between about 10 nm and about 25 nm.

In certain embodiments, the present invention relates to any one of the aforementioned membranes, wherein the average diameter of substantially all of the second plurality of pores is between about 1,000 nm and about 5,000 nm.

In certain embodiments, the present invention relates to any one of the aforementioned membranes, wherein the average diameter of substantially all of the second plurality of pores is between about 300 nm and about 3,000 nm.

In certain embodiments, the present invention relates to any one of the aforementioned membranes, wherein the average thickness of the porous support is between about 5 μm and about 100 μm.

In certain embodiments, the present invention relates to any one of the aforementioned membranes, wherein the selective barrier comprises a semi-permeable, interfacially-polymerized polyamide matrix.

In certain embodiments, the present invention relates to any one of the aforementioned membranes, wherein the average thickness of the selective barrier is between about 20 nm and about 500 nm.

In certain embodiments, the present invention relates to any one of the aforementioned membranes, wherein the polymeric additive is selected from the group consisting of polyalkylene glycols, polyalkylene oxides, polyoxoalkylenes, acrylamides, catecholamines and polyetheramines.

In certain embodiments, the present invention relates to any one of the aforementioned membranes, further comprising a backing layer on the second side of the porous support.

In certain embodiments, the present invention relates to any one of the aforementioned membranes, wherein the porous support is enmeshed in the backing layer. In other words, a portion of the porous support has polymerized within the backing layer.

In certain embodiments, the present invention relates to any one of the aforementioned membranes, wherein the backing layer is a woven or non-woven fabric.

In certain embodiments, the present invention relates to any one of the aforementioned membranes, wherein the backing layer comprises polyester.

In certain embodiments, the present invention relates to any one of the aforementioned membranes, wherein the average thickness of the backing layer is between about 10 μm and about 50 μm.

In certain embodiments, the present invention relates to any one of the aforementioned membranes, wherein the membrane is for use in a forward osmosis (FO) process or a pressure-retarded osmosis (PRO) process, wherein said semi-permeable membrane is used to separate components of a feed solution using a draw solution.

In certain embodiments, the present invention relates to any one of the aforementioned membranes, wherein the barrier layer has a high degree of selectivity for water and a very low resistance to water transport.

In certain embodiments, the present invention relates to any one of the aforementioned membranes, wherein the barrier layer is chemically resistant to conditions presented by a feed solution (such as fouling and cleaning agents).

In certain embodiments, the present invention relates to any one of the aforementioned membranes, wherein the porous support is chemically resistant to conditions presented by a draw solution (i.e., basic, acidic or oxidative environments).

In certain embodiments, the present invention relates to any one of the aforementioned membranes, wherein the porous support exhibits a high porosity and hydrophilicity, a low tortuosity and/or minimal thickness.

Permeability for semi-permeable membranes permeable to water can be defined as water flux at a given applied pressure. Conventional reverse osmosis membranes are known to lose permeability when exposed to hydraulic pressures greater than 10 bars (approximately 145 psi). It has been observed that hydraulic pressure, over time, measurably reduces the support structure thickness and that the relative decrease in thickness and permeability loss are both correlated with the applied pressure. Thus, it is generally believed that high applied pressure leads to physical compaction of macro-voids and micro-voids throughout the skin layer of the support structure, thereby decreasing permeability of a composite membrane.

In certain embodiments, the present invention relates to any one of the aforementioned membranes, wherein the membrane flux is between about 5 and about 10 gallons per square foot per day under operating conditions of 1 M NaCl draw solution and a DI feed solution at 25° C. In certain embodiments, the present invention relates to any one of the aforementioned membranes, wherein the membrane flux is between about 5.8 and about 8.4 gallons per square foot per day under operating conditions of 1 M NaCl draw solution and a DI feed solution at 25° C.

In certain embodiments, the present invention relates to any one of the aforementioned membranes, wherein the porous support is a porous support made by any one of the methods described below.

Selected Methods

Another aspect of the invention relates to a method of fabricating a porous support comprising a first side with a first plurality of pores, and a second side with a second plurality of pores, wherein the average diameter of substantially all of the first plurality of pores is between about 0.1 nm and about 100 nm, and the average diameter of substantially all of the second plurality of pores is between about 150 nm and about 5,000 nm; and the method comprises the steps of:

preparing a polymer solution comprising a polymer, a polymeric additive, and a first liquid;

contacting a surface with the polymer solution; and evaporating the liquid.

In certain embodiments, the present invention relates to any one of the aforementioned methods, wherein the polymer solution comprises about 10 to about 15 wt % of the polymer. In certain embodiments, the present invention relates to any one of the aforementioned methods, wherein the polymer solution comprises about 10 to about 12.5 wt % of the polymer. In certain embodiments, the present invention relates to any one of the aforementioned methods, wherein the polymer solution comprises about 12.5 to about 15 wt % of the polymer.

In certain embodiments, the present invention relates to any one of the aforementioned methods, wherein the polymer is selected from the group consisting of polysulfone, polyethersulfone, poly(ether sulfone ketone), poly(ether ethyl ketone), poly(phthalazinone ether sulfone ketone), polyacrylonitrile, polypropylene, poly(vinyl fluoride), polyetherimide, cellulose acetate, cellulose diacetate, and cellulose triacetate.

In certain embodiments, the present invention relates to any one of the aforementioned methods, wherein the average diameter of substantially all of the first plurality of pores is between about 1 nm and about 50 nm.

In certain embodiments, the present invention relates to any one of the aforementioned methods, wherein the average diameter of substantially all of the first plurality of pores is between about 10 nm and about 25 nm.

In certain embodiments, the present invention relates to any one of the aforementioned methods, wherein the average diameter of substantially all of the second plurality of pores is between about 1,000 nm and about 5,000 nm.

In certain embodiments, the present invention relates to any one of the aforementioned methods, wherein the average diameter of substantially all of the second plurality of pores is between about 300 nm and about 3,000 nm.

In certain embodiments, the present invention relates to any one of the aforementioned methods, wherein the average thickness of the porous support is between about 5 μm and about 100 μm.

In certain embodiments, the present invention relates to any one of the aforementioned methods, wherein the polymeric additive is selected from the group consisting of polyalkylene glycols, polyalkylene oxides, polyoxoalkylenes, acrylamides, catecholamines and polyetheramines.

In certain embodiments, the present invention relates to any one of the aforementioned methods, wherein the porous support is enmeshed in the surface. In other words, a portion of the porous support polymerized within the surface.

In certain embodiments, the present invention relates to any one of the aforementioned methods, wherein the surface is a woven or non-woven fabric.

In certain embodiments, the present invention relates to any one of the aforementioned methods, wherein the surface comprises polyester.

In certain embodiments, the present invention relates to any one of the aforementioned methods, wherein the average thickness of the surface is between about 10 μm and about 50 μm.

In certain embodiments, the present invention relates to any one of the aforementioned methods, wherein the membrane is for use in a forward osmosis (FO) process or a pressure-retarded osmosis (PRO) process, wherein said semipermeable membrane is used to separate components of a feed solution by using a draw solution.

In certain embodiments, the present invention relates to any one of the aforementioned methods, wherein the barrier layer has a high degree of selectivity for water and a low resistance to water transport.

In certain embodiments, the present invention relates to any one of the aforementioned methods, wherein the barrier layer is chemically resistant to conditions presented by a feed solution (such as fouling and cleaning agents).

In certain embodiments, the present invention relates to any one of the aforementioned methods, wherein the porous support is chemically resistant to conditions presented by a draw solution (i.e., basic, acidic or oxidative environments).

In certain embodiments, the present invention relates to any one of the aforementioned methods, wherein the porous support exhibits a high porosity, a high hydrophilicity, a low tortuosity and/or minimal thickness.

In certain embodiments, the present invention relates to any one of the aforementioned methods, wherein the first liquid comprises a main solvent and a co-solvent.

In certain embodiments, the present invention relates to any one of the aforementioned methods, further comprising the step of contacting the surface with a second liquid before the surface is contacted with the polymer solution.

In certain embodiments, the present invention relates to any one of the aforementioned methods, wherein the second liquid comprises a main solvent and co-solvent.

In certain embodiments, the present invention relates to any one of the aforementioned methods, wherein the second liquid comprises an additive.

In certain embodiments, the present invention relates to any one of the aforementioned methods, wherein the second liquid comprises an additive selected from the group consisting of polyalkylene glycols, polyalkylene oxides, polyoxoalkylenes, acrylamides, catecholamines and polyetheramines.

In certain embodiments, the present invention relates to any one of the aforementioned methods, wherein the main solvent is selected from the group consisting of NMP, DMF, DMSO, triethyl phosphate, dimethyl acetamide, and combinations thereof.

In certain embodiments, the present invention relates to any one of the aforementioned methods, wherein the co-solvent is selected from the group consisting of NMP, DMF, DMSO, triethyl phosphate, dimethyl acetamide, and combinations thereof and the co-solvent is not the same as the main solvent.

In certain embodiments, the present invention relates to any one of the aforementioned methods, wherein the ratio of the main solvent to the co-solvent is between 100:0 and about 50:50.

In certain embodiments, the present invention relates to any one of the aforementioned methods, wherein the main solvent is NMP; and the co-solvent is DMF.

EXEMPLIFICATION

The invention now being generally described, it will be more readily understood by reference to the following, which is included merely for purposes of illustration of certain aspects and embodiments of the present invention, and is not intended to limit the invention.

Materials and Chemicals.

Polysulfone (PS or PSf) beads ($M_n$: 22,000 Da), 1-methyl-2-pyrrolidinone (NMP, anhydrous, 99.5%), N,N-dimethylformamide (DMF, anhydrous, 99.8%), 1,3-phenylenediamine (MPD, >99%), and 1,2,5-benzenetricarbonyl trichloride (TMC, 98%) were used as received (Sigma-Aldrich, St. Louis, Mo.). TMC was dispersed in Isopar-G, a proprietary non-polar organic solvent (Univar, Redmond, Wash.). For the membrane performance tests, sodium chloride (NaCl, crystals, ACS reagent) from J. T. Baker (Phillipsburg, N.J.) and ammonium bicarbonate ($NH_4HCO_3$, powder, certified ACS) from Fisher Scientific (Pittsburgh, Pa.) were dissolved in deionized water (DI). DI was obtained from a Milli-Q ultrapure water purification system (Millipore, Billerica, Mass.).

A commercial polyester non-woven fabric (PET, Ahlstrom, Helsinki, Finland) was used as a backing layer for the PS supports. Commercial asymmetric cellulose triacetate (HTI-CTA) forward osmosis membranes (Hydration Technology Innovation, Albany, Oreg.) and thin-film composite seawater reverse osmosis membranes (SW30-HR) (Dow Chemical Company, Midland, Mich.) were acquired for comparison.

Casting of Polysulfone Support.

PS support membranes were hand-cast onto the thin low density PET backing layer. PS (12 wt %) was dissolved in a mixed solvent system of DMF:NMP. The solvents were mixed at a ratio of 1:3 DMF:NMP on a weight basis (i.e. the mixture was 25% DMF). The solution was stirred at room temperature (23° C.) for 8 hrs and then desiccated for at least 15 hrs prior to casting. PET fabric was attached to a clean glass plate using laboratory adhesive tape. NMP was applied to wet the fabric and excess NMP was removed using an air knife. A casting knife (Gardco, Pompano Beach, Fla.), set at a casting height of 150 μm, was used to spread the PS solution onto the wetted PET fabric. The whole composite was immediately immersed into a precipitation bath containing 3 wt % NMP in DI to initiate the phase separation. The membrane was allowed to sit in the precipitation bath for 10 min at which point it was transferred to a DI water bath where it was stored until polyamide formation.

Interfacial Polymerization of TFC Membrane.

Polyamide TFC membranes were produced by first immersing a hand-cast PS support membrane in an aqueous solution of 3.4 wt % MPD for 120 s. An air knife was used to remove the excess MPD solution from the support membrane surface. The MPD-saturated support membrane was then immersed into the 0.15 wt % TMC organic solution for 60 s, which resulted in the formation of an ultra-thin polyamide film. The resulting composite membranes were cured at 95° C. for 120 s, then rinsed with an aqueous solution of 200 ppm NaOCl followed by an aqueous solution of 1000 ppm NaHSO$_3$, before a final heat curing step at 95° C. for 120 s. The fabricated TFC membranes (TFC—FO) were rinsed thoroughly and stored in DI at 4° C.

SEM Imaging of Membrane.

Micrographs of the membranes were obtained utilizing a Hitachi Ultra-High-Resolution Analytical Field Emission Scanning Electron Microscope (FE-SEM) SU-70. Cross-sections were obtained by flash-freezing the membranes using liquid nitrogen then cracking the sample. An Emitech SC7620 sputtering machine was utilized to coat all samples for 15-30 s with gold-platinum.

Testing Membrane Performance in FO Mode.

The experimental crossflow FO system employed is similar to that previously described (McCutcheon, J. R.; McGinnis, R. L. Elimelech, M. A novel ammonia-carbon dioxide forward (direct) osmosis desalination process. *Desalination* 2005, 174 (1), 1-11; McCutcheon, J. R. Elimelech, M. Influence of concentrative and dilutive internal concentration polarization on flux behavior in forward osmosis. *Journal of Membrane Science* 2006, 284 (1-2), 237-247; and McCutcheon, J. R. Elimelech, M. Influence of membrane support layer hydrophobicity on water flux in osmotically driven membrane processes. *Journal of Membrane Science* 2008, 318 (1-2), 458-466). The crossflow membrane unit is custom built with channel dimensions of 77 mm long, 26 mm wide, and 3 mm deep on both sides of the membrane. The unit operates in co-current crossflow and no mesh spacers were utilized. Variable speed gear pumps (Cole-Parmer, Vernon Hills, Ill.) were used to pump the solutions in closed loops at 1.0 L/min (21.4 cm/s crossflow velocity) and a constant temperature water bath (Neslab, Newingotn, N.H.) was used to maintain the temperature of both the feed and draw solutions at 25±0.5° C. All TFC—FO membranes were tested in FO mode; that is, with the porous support layer against the draw solution and the active layer against the feed solution.

The experimental protocol to determine water flux is similar to that previously described (McCutcheon, J. R.; McGinnis, R. L. Elimelech, M. A novel ammonia-carbon dioxide forward (direct) osmosis desalination process. *Desalination* 2005, 174 (1), 1-11; and Ang, W. S. Elimelech, M. Protein (BSA) fouling of reverse osmosis membranes: Implications for wastewater reclamation. *Journal of Membrane Science* 2007, 296 (1-2), 83-92), with 1.5 M NaCl as draw solution and DI as feed solution. After water flux and temperature were stabilized, the flux was taken as the averaged reading over 1 hr. The draw solution concentration is assumed to be constant throughout the experiment since volumetric water flux was low relative to the volume of draw solution.

A similar experimental protocol was used to determine membrane performance and chemical stability with ammonium bicarbonate draw solution (1.5 M NH$_4$HCO$_3$). After this initial test, the membrane was rinsed with DI and stored in 1.5 M NH$_4$HCO$_3$ bath (pH 7.88) at 4° C. for 7 days to simulate prolonged exposure to high concentrations of NH$_4$HCO$_3$. Growth of microorganisms on the membrane was minimized by storage at low temperature. The membrane was then removed from the bath, rinsed thoroughly with DI, and re-tested in the FO setup with the same concentration of draw solution.

Determination of Pure Water Permeability and Salt Rejection.

Performance of the TFC-FO membranes and of the commercial membranes was evaluated in a laboratory-scale crossflow RO test unit (Ang, W. S. Elimelech, M. Protein (BSA) fouling of reverse osmosis membranes: Implications for wastewater reclamation. *Journal of Membrane Science* 2007, 296 (1-2), 83-92). The effective membrane area was 13.85 cm$^2$, the crossflow velocity was fixed at 21.4 cm s$^{-1}$ (unless otherwise noted), and temperature was constant at 25° C. The loaded membrane was first compacted with DI at an applied pressure, ΔP, of 400 psi (27.6 bar) until the permeate flux reached a steady state (at least 15 hrs). Pure water flux, $J_w$, was calculated by dividing the volumetric permeate rate by the membrane area. The TFC-FO membranes are designed to withstand an FO operation pressure drop significantly lower than that of RO seawater operations. Therefore, membrane selectivity was characterized by keeping the applied pressure at 400 psi (27.6 bar) and measuring rejection of 50 mM NaCl solution using a previously calibrated conductivity meter (Oakton Instruments, Vernon Hills, Ill.).

Intrinsic water permeability, A, was determined by dividing the pure water flux by the specified applied pressure, $A=J_w/\Delta P$. Observed NaCl rejection, R, was determined from the difference in bulk feed $c_b$ and permeate $c_p$ solute concentrations, $R=1-c_p/c_b$. The reported rejection values are the average of three different measurements collected over approximately 30 min each. The solute permeability coefficient, B, was determined from:

$$B = J_w\left(\frac{1-R}{R}\right)\exp\left(\frac{J_w}{k}\right)$$

where k is the mass transfer coefficient (Baker, R., *Membrane technology and applications.* 2nd ed.; Wiley: 2004; p 552; and Mulder, J., *Basic principles of membrane technology.* 2nd ed.; Springer: 1996; p 584).

Determination of FO Membrane Structural Parameters.

The support layer resistance to solute diffusion, K, of one hand-cast TFC membrane was determined using the experimental protocol previously described (McCutcheon, J. R. Elimelech, M. Influence of concentrative and dilutive internal concentration polarization on flux behavior in forward osmosis. *Journal of Membrane Science* 2006, 284 (1-2), 237-247). Water flux was measured in FO mode with DI as feed solution and draw (NaCl) concentrations of 0.05, 0.1, 0.5, 1.0 and 1.5 M. The resulting flux versus osmotic pressure data was used to calculate the resistance to solute diffusion, K, via fitting to:

$$K = \left(\frac{1}{J_w}\right)\ln\frac{B + A\pi_{D,b}}{B + J_W + A\pi_{F,m}}$$

(Loeb, S.; Titelman, L.; Korngold, E. Freiman, J. Effect of porous support fabric on osmosis through a Loeb-Sourirajan type asymmetric membrane. *Journal of Membrane Science* 1997, 129 (2), 243-249). Here, $J_w$ is the measured water flux, $\pi_{D,b}$, the bulk osmotic pressure of the draw solution, and $\pi_{F,m}$ the osmotic pressure at the membrane surface on the feed side (zero for DI feed). The resistance to diffusion K is expressed as the reciprocal of a thin-film mass transfer coefficient (K. L. Lee, R. W. Baker, H. K. Lonsdale, Membranes for Power-Generation by Pressure-Retarded Osmosis, J. Membr. Sci., 8 (1981) 141-171):

$$K = \frac{t_s \tau}{D\varepsilon}$$

where D is the diffusion coefficient of the draw solute, $t_s$ is the support layer thickness, $\tau$ the tortuosity, and $\varepsilon$ the porosity (J. R. McCutcheon, M. Elimelech, Influence of concentrative and dilutive internal concentration polarization on flux behavior in forward osmosis, J. Membr. Sci., 284 (2006) 237-247).

The membrane structural parameter S:

$$S = KD = \frac{t_s \tau}{\varepsilon}$$

is independent of the draw solution properties, assuming the draw solutes do not swell or plasticize the PS and PET layers. The effect of the support layer thickness, $t_s$, is used to arrive at a new parameter depicting the ratio of porosity to tortuosity:

$$\frac{\varepsilon}{\tau} = \frac{t_s}{S}$$

This thickness-independent porosity parameter, which describes the structure of the membrane support layer, is bounded between 0 and 1 because the theoretical range of porosity is between 0 and 1 and tortuosity is greater than or equal to 1.

Determination of the Cloud Point.

The cloud point was determined by a titrimetric method using 12 wt % PS solutions at room temperature (23° C.). Polymer solutions were dissolved in a pure or mixed solvent and placed in a sealable bottle. The solutions were stirred while pure nonsolvent (DI water) was added until the polymer solution became irreversibly turbid as determined by visual detection. The cloud point was calculated as the mass ratio of nonsolvent to total polymer solution plus the nonsolvent (J. G. Wijmans, J. Kant, M. H. V. Mulder, C. A. Smolders, Phase-Separation Phenomena in Solutions of Polysulfone in Mixtures of a Solvent and a Nonsolvent—Relationship with Membrane Formation, Polymer, 26 (1985) 1539-1545).

Support Layer Structure

In the following examples, the volume of both the feed and draw solutions at the start of each experimental run was 2.0 L. A 1.0 M NaCl solution was used for the draw solution and DI was used as the feed solution. The resulting bulk osmotic pressure difference, $\Delta\pi$, calculated using a software package from OLI Systems, Inc. (Morris Plains, N.J.), was 702 psi (48.4 bar). After the water flux stabilized, the flux was taken as the average reading over 1 h. The draw solution concentration is assumed to be constant throughout the experiment, since the volumetric water flux was low relative to the volume of draw solution.

Role of Solvent-Polymer Interaction

Figure 13:
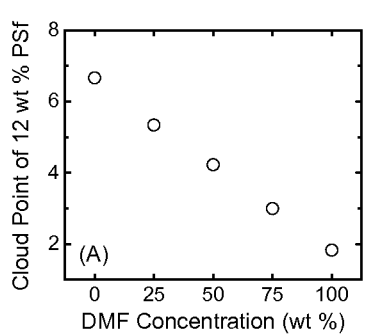
FIGS. 13A and B depict a graph showing the observed cloud points of 12 wt % PS and related bimodal points in the ternary diagram as a function of DMF concentration in the dope solution.
Figure 13:
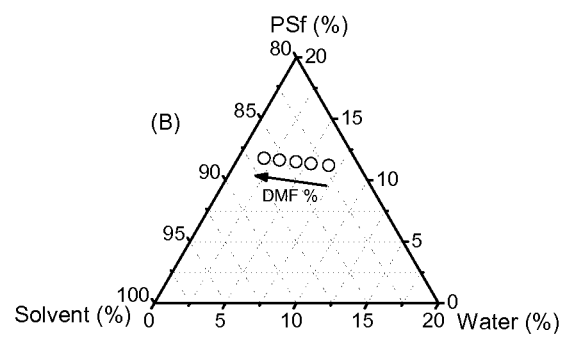

The cloud point correlates directly with the position of the binodal boundary on a ternary phase diagram, allowing the thermodynamic properties of the system at the point of phase separation to be characterized. Therefore, the cloud point value, which can be determined by simple turbidity measurements, is useful for comparing the behavior of casting dope solutions with different solvent compositions. Although the system investigated in this study consists of four components (NMP/DMF/PS/water), the thermodynamic state can be represented with a simplified pseudo-ternary phase diagram where NMP and DMF are grouped together for analysis as "solvent". Cloud point data for the present system with varying DMF and NMP concentrations in the initial solvent mixture are presented in FIG. 13. The more DMF is incorporated into the mixture, a smaller amount of water is needed to initiate phase separation (FIG. 13A). On the pseudo-ternary diagram, this translates to a shift of the binodal closer to the polymer-solvent axis (FIG. 13B) for higher DMF concentrations. This observation is in agreement with NMP being a better solvent for PS than DMF For the PS solvent-water system, where strong polymer-nonsolvent repulsion is present, the value of the Flory-Huggins interaction parameter, $\chi_{PS/water}$, determines the location of the point where the binodal intersects the polymer-nonsolvent. A value of 5.9, a high positive value consistent with strong repulsive forces, was found for $\chi_{PSwater}$ using swelling experiments, thereby fixing the intersection in the high polymer concentration region. This fixed intersect, together with the measured cloud point data, provides a reasonable estimate of the binodal boundary for the different systems.

In addition to the thermodynamic conditions during phase separation, polymer precipitation is affected by the rates of nonsolvent influx and solvent outflux to and from the polymer solution film, respectively. Therefore, the final membrane morphology depends on the balance between the solvent-nonsolvent inter-diffusion and the polymer vitrification, defined as the process in which the casting solution solidifies crossing the glassy region in the phase diagram. NMP is a more favorable solvent for PS and, hence, permeates into the precipitation bath more slowly than DMF. A slower rate of outward solvent diffusion allows a more rapid influx of non-solvent into the precipitating film. This difference in solvent-nonsolvent exchange rates between NMP and DMF results in rapid and slow advancing nonsolvent fronts, respectively. This front initiates a phase separation of the system as it advances into the polymer film. Therefore, in a mixed solvent system, the velocity of the phase separation front can be tailored by controlling the relative amounts of the two solvents.

Figure 14:
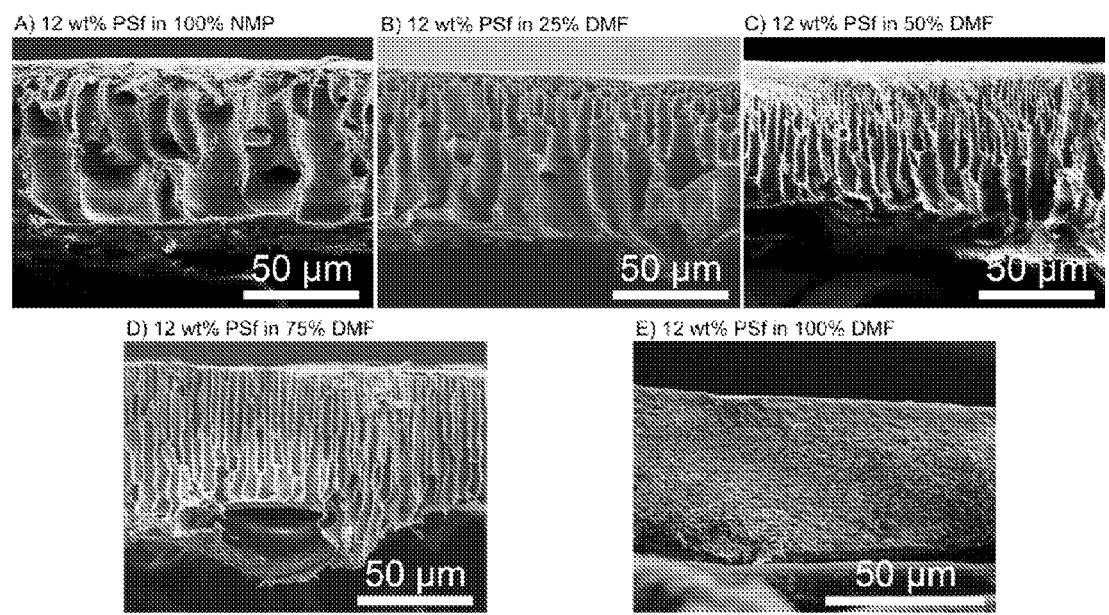
FIGS. 14A-E depict SEM micrographs displaying the cross-section of membranes cast as a fixed PS concentration (12 wt %) and increasing DMF concentrations.

SEM micrographs of the membrane cross-sections are presented in FIG. 14. The membranes were all cast from 12 wt % PS solutions with the concentration of DMF in the casting solution increasing from 0 wt % to 100 wt %. In all the investigated cases where NMP is present in the solvent mixture, the structure is dominated by macrovoids (FIGS. 14A-D). The finger-like pore structure starts just beneath the top surface and spans the entire membrane thickness. This finding is consistent with the observation that macrovoids nucleate just beneath the free surface, then grow into the film when the inward flux of nonsolvent exceeds the outward flux of solvent. The use of NMP in the solvent mixture causes the nonsolvent diffusion front to move at a faster rate than the vitrification front, puts the system under rapid demixing conditions, and sustains the driving force necessary to create extended macrovoids.

As the DMF content increases, the nonsolvent advances into the polymer solution film more slowly, while the vitrification front moves more quickly relative to the nonsolvent front. This occurs due to the shift of the binodal boundary and causes a transition to less rapid (delayed) onset of demixing. This transition is accompanied by a progressive decrease in the size of macrovoids and the formation of a denser and thicker skin layer, which will eventually create a cellular or sponge-like morphology free of macrovoids. Using the SEM micrographs in FIG. 14, the macrovoid sizes are quantitatively evaluated by measuring the average finger width (Table 1). Consistent with expectations, the average finger width decreases with increasing DMF content, and for 100 wt % DMF, the layer has a sponge-like morphology over the entire thickness (FIG. 14E).

TABLE 1

Summary of active (top) side pore sizes and cross-sectional finger width of the support layers measured by SEM image analysis.
Support Layer Pore Size (nm)
[Support Layer Finger Width (μm)]

| | | DMF Concentration (wt %)→ | | | | |
|---|---|---|---|---|---|---|
| | | 0 | 25 | 50 | 75 | 100 |
| PSf Concentration (wt %) ↓ | 9 | 38.8 ± 18.4 nm [27.3 ± 6.3 μm] | | | | 39.6 ± 15.6 nm [9.9 ± 1.6 μm] |
| | 12 | 38.5 ± 14.1 nm [20.0 ± 6.2 μm] | 22.1 ± 9.1 nm [17.2 ± 4.6 μm] | 25.6 ± 13.2 nm [5.5 ± 1.9 μm] | 28.4 ± 12.3 nm [2.6 ± 0.7 μm] | 35.7 ± 16.8 nm [NA] |
| | 15 | 22.7 ± 10.7 nm [16.4 ± 3.8 μm] | | | | 24.3 ± 8.4 nm [NA] |
| | 18 | 20.3 ± 7.0 nm [11.3 ± 3.2 μm] | | | | NA [NA] |

For each support layer, 100 pores and 25 finger-like features were measured. The reported values are the average and standard deviation of the measurement values related to 3 separately cast support layers. "NA" means Not Applicable.

The final thickness of the support membranes is also influenced by the processing conditions used during the layer formation. The thicknesses, measured using a digital micrometer, monotonically decrease as the DMF concentration in the initial dope solution increases (Table 2), despite maintaining a constant gate height of 250 μm (~10 mils) during casting. Under less rapid demixing conditions, the PS has more time to relax and begins to vitrify later in the phase inversion process, thereby resulting in a thinner film.

TABLE 2

Summary of TFC-FO thicknesses measured prior to RO testing.
Support Layer Thicknesses (μm)
[Compaction after RO Test (%)]

| | | DMF Concentration (wt %)→ | | | | |
|---|---|---|---|---|---|---|
| | | 0 | 25 | 50 | 75 | 100 |
| PSf Concentration (wt %) ↓ | 9 | 141.7 ± 8.1 μm [45.2%] | | | | 92.3 ± 5.4 μm [21.4%] |
| | 12 | 144.6 ± 10.5 μm [27.1%] | 124.1 ± 5.1 μm [9.0%] | 105.9 ± 12.5 μm [10.7%] | 97.9 ± 6.9 μm [10.0%] | 84.3 ± 8.6 μm [14.1%] |
| | 15 | 139.2 ± 14.2 μm [9.5%] | | | | 98.1 ± 6.2 μm [16.4%] |
| | 18 | 132.8 ± 18.8 μm [6.2%] | | | | 103.7 ± 5.2 μm [NA] |

The percent compaction of the membrane after testing in RO mode at an applied pressure of 400 psi (27.6 bar) and 25 ± 0.5° C. is shown in the square brackets. Values are the average of 3 separately cast membranes.

In addition to the structure of the porous sublayer, the characteristics of the top layer are crucial for membrane functionality. The structure, porosity, and hydrophobicity of the skin layer were demonstrated to impact the permeability and separation properties of the PA barrier layer subsequently formed via interfacial polymerization. The average and standard deviation of surface pore diameters after the phase inversion process are reported in Table 1. The pore size decreases sharply for a layer cast from 25 wt % DMF, compared to the 100% NMP condition, and with further increases in DMF concentration, the pore size steadily increases.

It has been hypothesized that the denser skin layer and the more porous sublayer are formed by two separate mechanisms. For the top skin layer, the structure is primarily determined by the order of events during phase separation. Two scenarios are possible. In the first scenario, liquid-liquid phase separation occurs prior to the concentrated polymer phase beginning to gel. Here, the precipitation pathway intersects the binodal before crossing into the gelation region, causing a lower polymer concentration and an open skin layer with larger pores (Case I). For the second scenario, the polymer begins to gel before phase separation occurs (i.e., the precipitation pathway passes through the gelation boundary before entering into the two-phase region). This results in a higher polymer concentration at the top surface and a denser skin layer with smaller pores (Case II). We hypothesize that at 0 wt % DMF the ratio of NMP outflux to water influx is small, giving rise to conditions for Case I. However, at 25 wt % DMF, the ratio of solvent outflux to water influx increases, altering the formation pathway to that of Case II. Therefore, the surface pore sizes of membranes cast in 25 wt % DMF are smaller than those made with only NMP. Then, with increasing DMF concentrations, the formation mechanism is Case II, but the average pore diameter changes due to shifting of the binodal boundary. As the binodal approaches the polymer-solvent axis, there will be a lower local concentration of PS when the polymer vitrifies, resulting in larger surface pores.

Role of Polymer Concentration

In general, increasing the polymer concentration in solution results in a higher viscosity, which tends to reduce transport rates thereby, producing slower demixing. Additionally, when casting membranes from solutions with higher polymer concentrations, the precipitation paths cross the binodal at higher polymer concentrations. These factors combine to produce membranes with thicker top layers, lower porosities, and diminished macrovoid formation.

Figure 15:
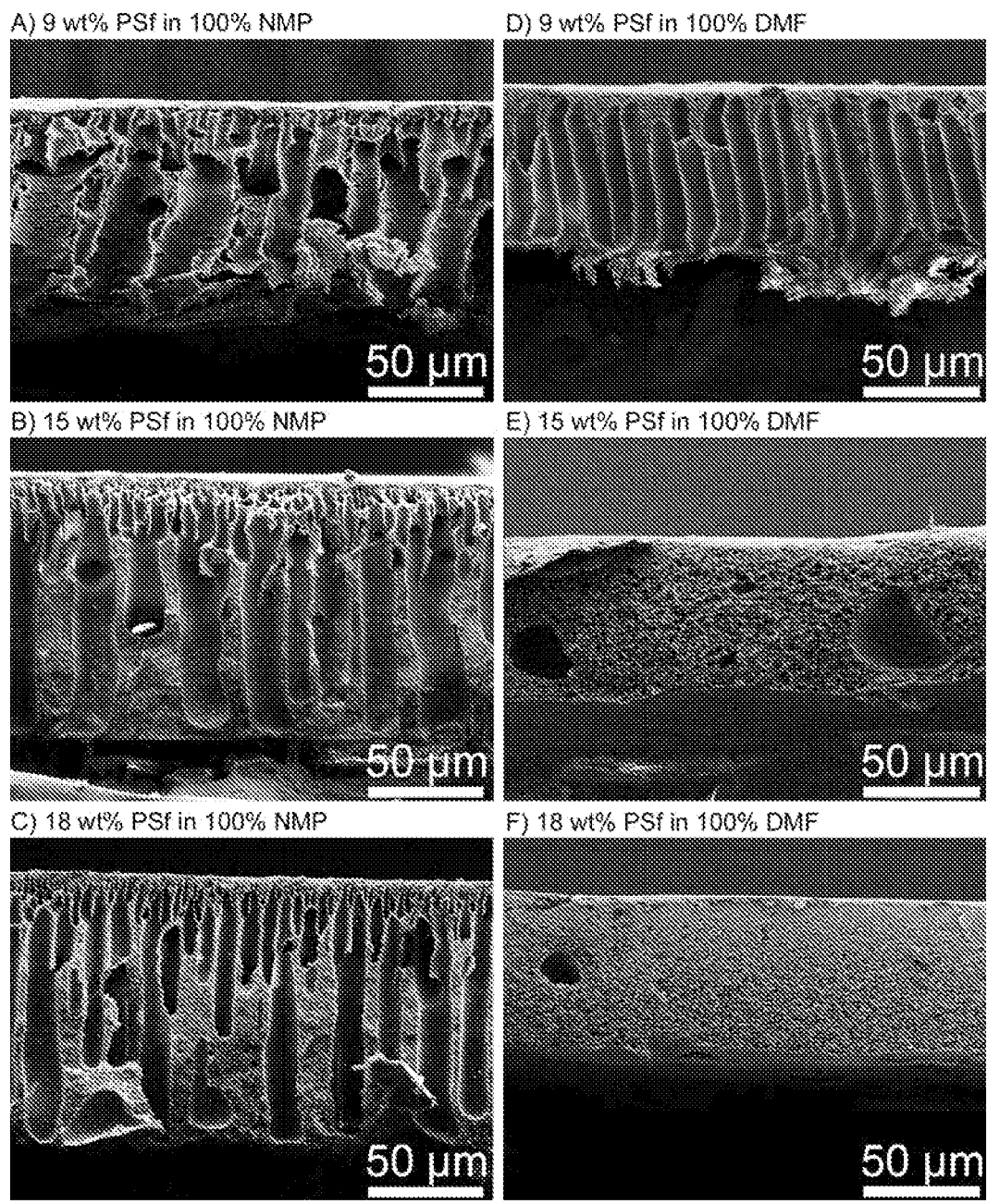
FIGS. 15A-F depict SEM micrographs of the cross section of support membranes cast from 9, 15, and 18 wt % PS concentration in 100% NMP or DMF.

Our experimental observations were consistent with these trends. The membranes cast from 100 wt % NMP solutions (FIGS. 14A and 15A-C) appear to have thicker skin layers as the PS concentration increases. SEM micrographs show that the macrovoid size and length decreased with increasing polymer concentration; the finger diameter measurements presented in Table 1 confirm this observation. For the membranes cast from 100% DMF solutions, a dense sponge-like morphology formed for PS concentrations of 12 wt % and higher (FIGS. 14E and 15E-F).

The membrane formed from a 9 wt % PS in 100% DMF solution (FIG. 15D) had uniform finger-like macrovoids spanning the layer thickness, but with a relatively thick skin layer of a dense sponge-like morphology. This substantiates the claim that there are different structure formation pathways for the skin layer and the underlying sublayer. For the skin layer of the 100 wt % DMF membrane, vitrification began prior to phase separation as well as for other membranes cast using DMF as solvent (Case II), resulting in the formation of a dense skin. If the polymer is viscous enough to maintain slow demixing conditions, a sponge-like morphology persists throughout the entire layer. However, we hypothesize that for the 9 wt % PS solution, slow demixing conditions cannot be sustained because of the low solution viscosity, thereby resulting in the formation of macrovoids in the sublayer.

The observed trend of the membrane thickness fabricated at various polymer concentrations can be related to the structure formation mechanism (Table 2). The films cast from 100 wt % NMP solutions all had similar thicknesses, with a small decrease at the highest PS concentration. This is consistent with rapid demixing conditions where the polymer chains have little time to rearrange prior to commencement of vitrification. The membranes cast from 100 wt % DMF solutions were thinner because the polymer was given time to rearrange due to the slow demixing conditions. However, due to the transition in demixing regime that caused the change in membrane structure, the 9 wt % PS membrane did not follow this trend.

Increasing the PS concentration in the casting solution increases the local concentration of polymer at the film-bath interface when precipitation occurs (and tends to produce Case II conditions for the top layer formation, as discussed earlier), which leads to surface pores with smaller radii. The measured average surface pore diameters follow this trend, regardless of the solvent employed (Table 1). A decrease in pore size with an increase in PS concentration was also observed on the bottom side of the support layer (images not displayed). Once again, the presence of macrovoids in the sublayer is associated with open pores at the bottom surface, and a smaller finger width corresponds to smaller pores. In the case of sponge-like structures, no large open pores are observed at the bottom surface.

Role of Substrate Layer Wetting

To investigate the role of the casting substrate on membrane structure, support layers were cast without the pretreatment step of wetting the PET layer with solvent. The compositions of the casting solutions used to form these support layers are 12 and 15 wt % PS in 100% NMP solvent. When the support layer was cast without pre-wetting the PET, the cross-sectional morphology was similar to that achieved by casting onto a wetted fabric, i.e., finger-like voids spanning the layer thickness were observed. However, the bottom side pore structure was markedly different. The cross-section suggests that the polymer solution had seeped through the PET layer during casting, thus creating an additional PS layer underneath the PET fabric that had a dense sponge-like morphology. In contrast to the open pores present with wetted PET fabric, a closed bottom surface is present for support layer casting without pre-wetting the PET. The solvent wetting the PET excludes the casting solution from the voids in the PET fabric, thus preventing it from contacting the underlying substrate. Additionally, the presence of solvent in the fabric dilutes the casting solution at the fabric-film interface, thereby decreasing the local polymer concentration.

Influence of Initial Casting Blade Height on Film Structure

Figure 16:
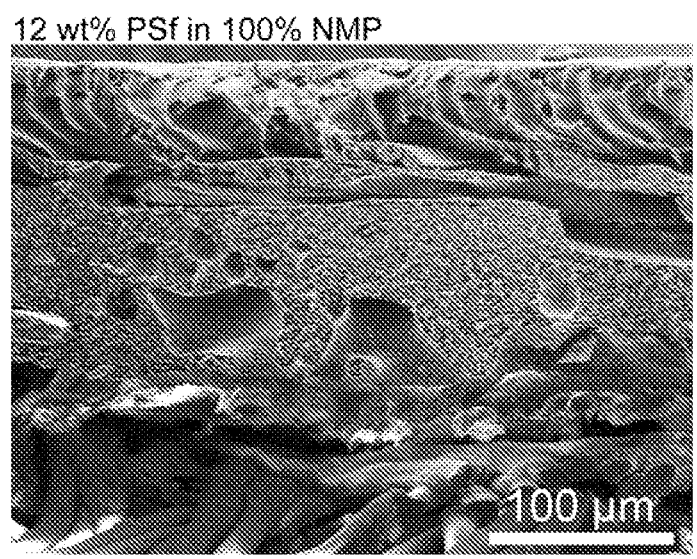
FIG. 16 depicts an SEM micrograph of a cross-section of a support membrane cast from 12 wt % PS in 100% NMP at a blade height of 20 mils yielding a 266±12 µm thick membrane. 1 mil is equivalent to 0.001 inch or 25.4 µm.

Thicker support membranes were cast from 12 wt % PS in 100 wt % NMP by setting the gate height of the casting knife at 500 μm (~20 mils) instead of 250 μm (~10 mils). A cross-sectional micrograph of the resulting support layer structure is shown in FIG. 16. Macrovoids did form in the upper portion (i.e., the section near the active layer) of the support membrane, but these transitioned to the denser sponge-like morphology in the lower portion of the membrane. This change in structure is attributed to the different rates of demixing that occur as phase precipitation proceeds. Initially, rapid demixing causes a finger-like morphology with macrovoids forming in the upper portion of the membrane. As the upper layer forms, it increases the resistance to the inward diffusion of nonsolvent, causing a transition to delayed (slow) demixing further into the film. Because delayed demixing favors the formation of a cellular sponge-like morphology, the transition to this type of structure was observed in the lower portion of the layer. This structure was not observed for the films cast using the lower blade height because the total film thickness was not large enough to cause a transition from rapid to delayed demixing.

Membrane Performance

FO Performance and Membrane Support Layer Porosity

Figure 8:
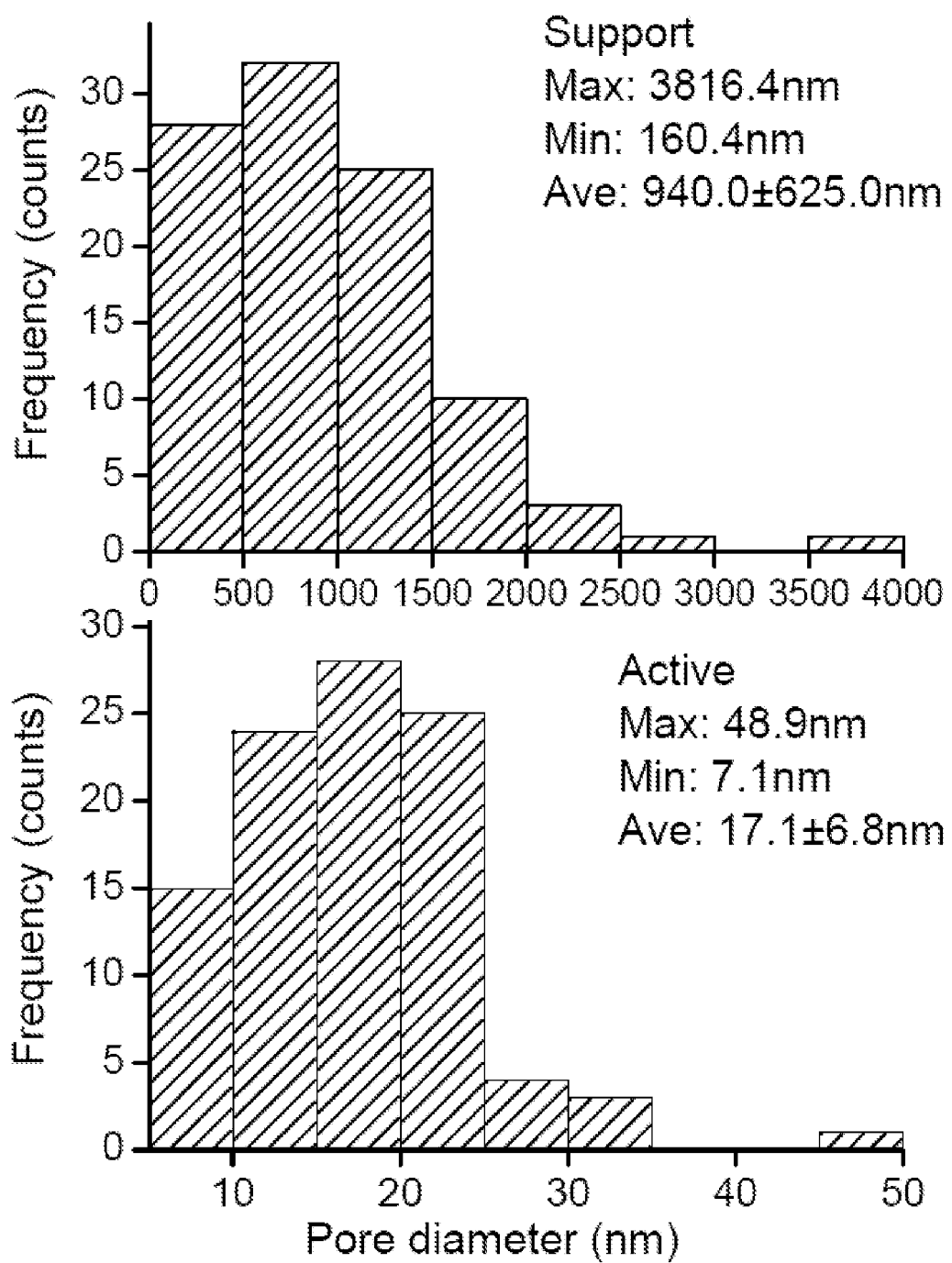
FIG. 8 depicts bar graphs showing (bottom) the pore size distributions for the active side; and (top) the pore size distributions for the support side of the polysulfone layer shown in FIGS. 6 and 7, respectively.
Figure 9:
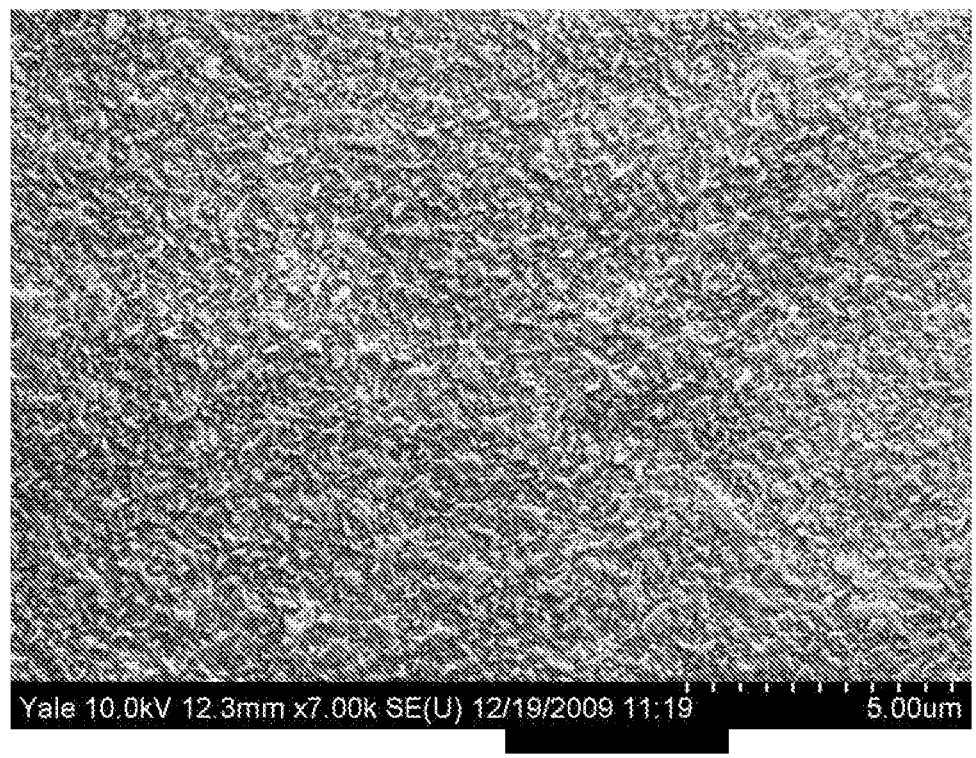
FIG. 9 depicts an electron micrograph of a fabricated polyamide layer surface of a TFC membrane after interfacial polymerization. The typical hill and valley structure is visible. Membrane selectivity is independent of film thickness; and flux is inversely proportional to the thickness of the PA barrier layer.
Figure 10:
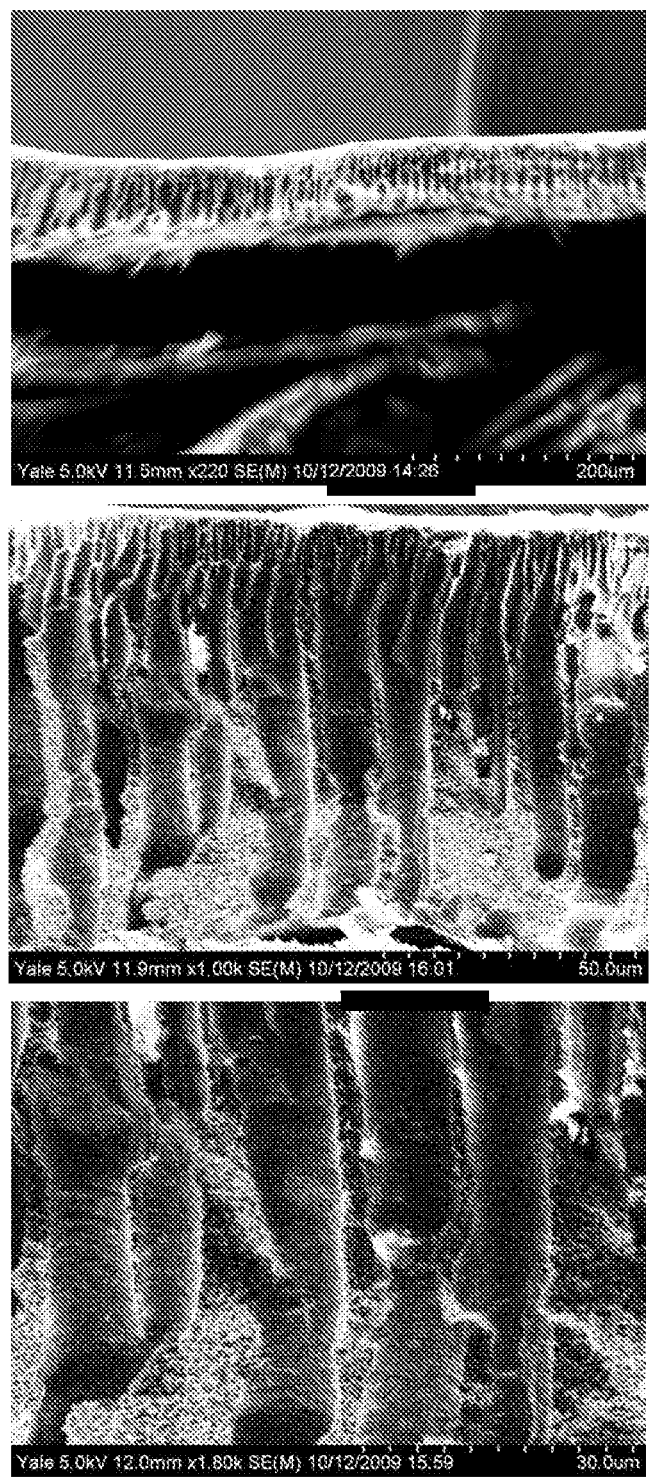
FIG. 10 depicts electron micrographs of a fabricated TFC membrane, cross-sectional view of a membrane of the invention at various magnifications.
Figure 11:
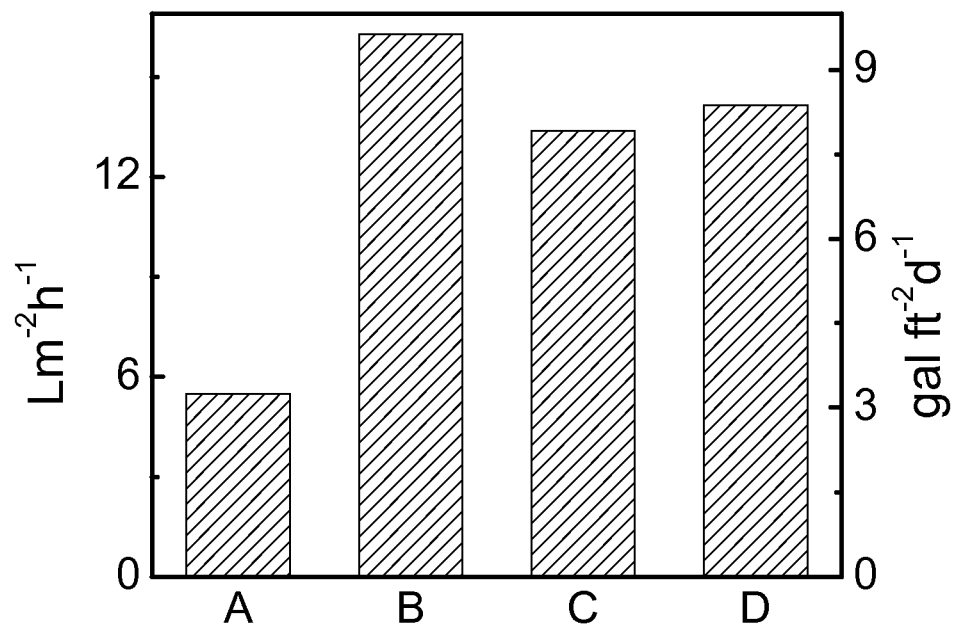
FIG. 11 depicts the results of forward osmosis flux performance tests: (A) hand-cast polyamide on polysulfone ultrafiltration (UF) membrane (M-PS20-GPET) acquired from Sepro Membranes (Oceanside, Calif.); (B) hand-cast polyamide and polysulfone membrane #1 (polysulfone support layer cast with 12% (wt/wt) PS solution in 100% NMP solvent); (C) hand-cast polyamide and polysulfone membrane #2 (polysulfone support layer cast with 12% (wt/wt) PS solution in 75:25% NMP:DMF solvent); and (D) hand-cast polyamide and polysulfone membrane #3 (polysulfone support layer cast with 15% (wt/wt) PS solution in 50:50% NMP: DMF solvent). The tests were carried out at 25° C. with 1 M NaCl as draw solution, deionized (DI) water as feed solution, and with 21.4 $cms^{-1}$ crossflow velocity. All four membranes showed salt rejection greater than about 96% when tested in a reverse osmosis module (400 psi and 50 mM NaCl as feed solution).
Figure 12:
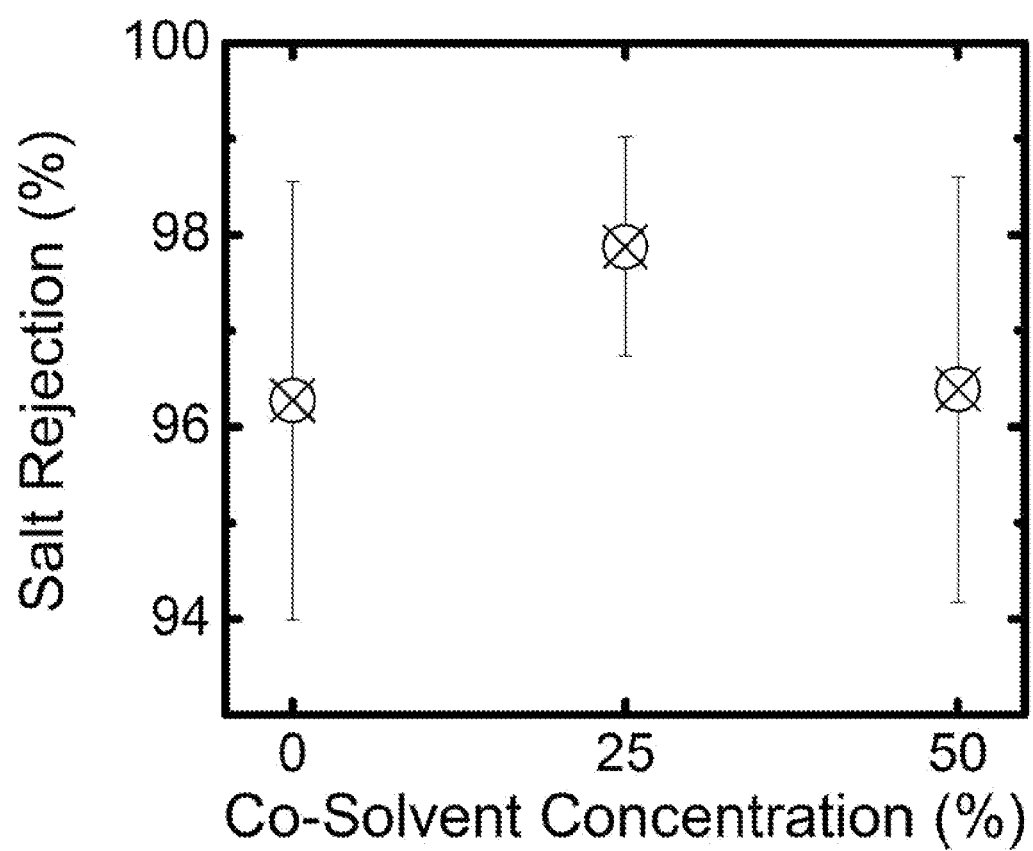
FIG. 12 depicts a graph showing the salt rejection percentages for hand-cast polyamide and polysulfone membranes (polysulfone support layer cast with 12% (wt/wt) PS solution in 100% NMP with no DMF co-solvent, in 75% NMP with 25% DMF as a co-solvent; and in 50% NMP with 50% DMF as a co-solvent).

The experimentally measured FO water fluxes for the different TFC membranes are presented in FIG. 8 and summarized in Table 3. To isolate the effects of support layer structure on FO water flux, the same PA formation protocol was used in the fabrication of all the membranes and only the support layer formulations were varied. For support membranes cast from 100% NMP and DMF solutions with varying PS concentration, the water flux increases as the polymer concentration decreases (FIG. 17A). At concentrations of 9 and 12 wt %, the average water fluxes for the membranes cast from the DMF solutions were higher than corresponding membranes cast from NMP solutions. The opposite result is observed for the 15 wt % PS membranes. Data for membranes cast at a constant PS concentration of 12 wt % with varying solvent compositions are shown in FIG. 17B. The water flux decreases as the DMF content increases from 0 wt % to 25 wt %, while further increases in the DMF content resulted in the FO water flux also increasing. All FO water flux data are compared in FIG. 17C. In this bubble plot, the bubble diameter corresponds to the magnitude of the water flux.

TABLE 3

Summary of Measured FO Water Flux $J_w$, NaCl Observed Rejection R, and Calculated Structural Parameter S, Porosity Parameter $\epsilon/\tau$, Intrinsic permeability A, and NaCl Permeability Coefficient B for the Membranes Tested.

| Membrane | | | | Porosity | | NaCl | |
|---|---|---|---|---|---|---|---|
| PS Concentration (wt %) | DMF Concentration (wt %) | FO Water Flux $J_w$ ($L\,m^{-2}h^{-1}$) | Structural Parameter S (µm) | Parameter $\epsilon/\tau$ ($L\,m^{-2}h^{-1}$) | Intrinsic Permeability A ($L\,m^{-2}h^{-1}bar^{-1}$) | Permeability Coefficient B ($L\,m^{-2}h^{-1}$) | NaCl Rejection R (%) |
| 9 | 0 | 20.5 ± 3.8 | 389 ± 150 | 0.222 ± 0.088 | 1.63 ± 0.18 | 0.84 ± 0.19 | 95.8 ± 1.3 |
| 12 | 0 | 13.9 ± 1.0 | 530 ± 48 | 0.201 ± 0.022 | 1.04 ± 0.17 | 0.63 ± 0.20 | 96.7 ± 1.4 |
| 15 | 0 | 9.2 ± 0.2 | 964 ± 301 | 0.140 ± 0.046 | 0.97 ± 0.44 | 0.25 ± 0.12 | 96.8 ± 3.1 |
| 18 | 0 | 6.2 ± 2.8 | 2677 ± 2189 | 0.064 ± 0.033 | 1.09 ± 0.06 | 0.47 ± 0.29 | 97.2 ± 1.0 |
| 12 | 25 | 10.8 ± 2.4 | 676 ± 111 | 0.163 ± 0.032 | 0.93 ± 0.37 | 0.52 ± 0.29 | 97.3 ± 1.0 |
| 12 | 50 | 12.5 ± 1.0 | 577 ± 108 | 0.166 ± 0.014 | 0.93 ± 0.24 | 0.27 ± 0.03 | 97.7 ± 0.4 |
| 12 | 75 | 14.3 ± 2.5 | 545 ± 77 | 0.155 ± 0.020 | 1.17 ± 0.23 | 0.42 ± 0.16 | 97.9 ± 0.6 |
| 9 | 100 | 25.0 ± 4.1 | 312 ± 72 | 0.264 ± 0.087 | 1.90 ± 0.30 | 0.33 ± 0.19 | 98.6 ± 0.8 |
| 12 | 100 | 17.6 ± 0.4 | 502 ± 59 | 0.140 ± 0.029 | 1.75 ± 0.35 | 0.33 ± 0.14 | 98.5 ± 0.3 |
| 15 | 100 | 5.6 ± 1.6 | 2511 ± 1168 | 0.036 ± 0.013 | 1.05 ± 0.05 | 0.84 ± 0.19 | 99.3 ± 0.3 |
| 18 | 100 | 0.5 ± 0.1 | 7934 ± 1051 | 0.012 ± 0.002 | 0.66 ± 0.39 | 0.84 ± 0.19 | 96.2 ± 2.5 |
| PET Not Wetted | | | | | | | |
| 12 | 0 | 5.4 ± 0.6 | 2232 ± 447 | 0.040 ± 0.008 | 0.92 ± 0.06 | 0.13 ± 0.06 | 99.2 ± 0.4 |
| 15 | 0 | Below Detection | NA | NA | 0.13 | 0.10 | 94.6 |
| Higher CastingThickness (height) | | | | | | | |
| 12 | 0 (20 mils) | 5.6 | 2563 | 0.057 | 1.41 | 0.20 | 99.0 |

Due to the different amount of vertical shrinkage that can occur during the phase separation process, when examining the influence of membrane structure on FO water flux for different membranes, comparing the measured water fluxes or the membrane structural parameters is slightly misleading. The ratio of the membrane support layer porosity to tortuosity, $\epsilon/\tau$, is a better indicator of the inherent resistance to diffusion provided by the structure because it describes the structure of the support layer after correcting for the effect of the membrane thickness. The value of the parameter can range from 0 to 1, with a value of 1 being desired to minimize the detrimental effects of ICP. Experimentally, $\epsilon/\tau$ was calculated by dividing the thickness of the membrane measured after FO testing (summarized in Table 2) by the membrane structural parameter, S, as determined from the FO test. In this calculation, the contribution of the ultrathin selective layer to the total membrane thickness is considered negligible.

Figure 17:
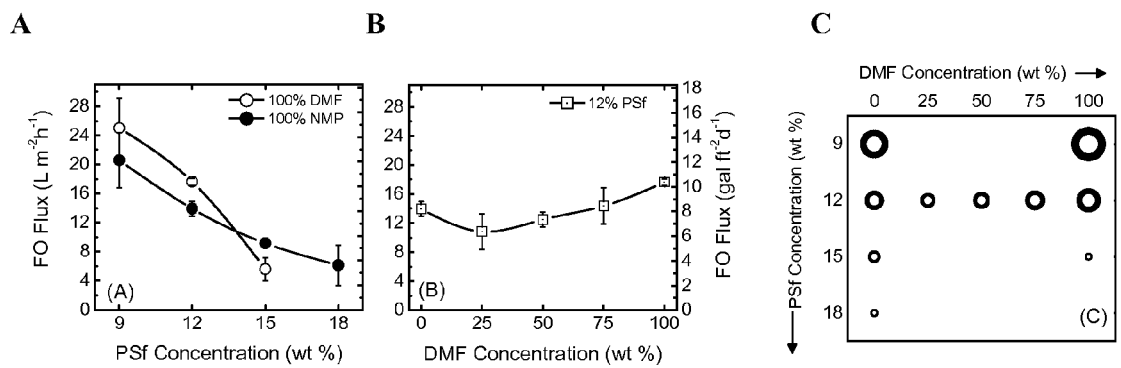
FIGS. 17A-C show a comparison of FO water fluxes between the different TFC FO membranes.
Figure 18:
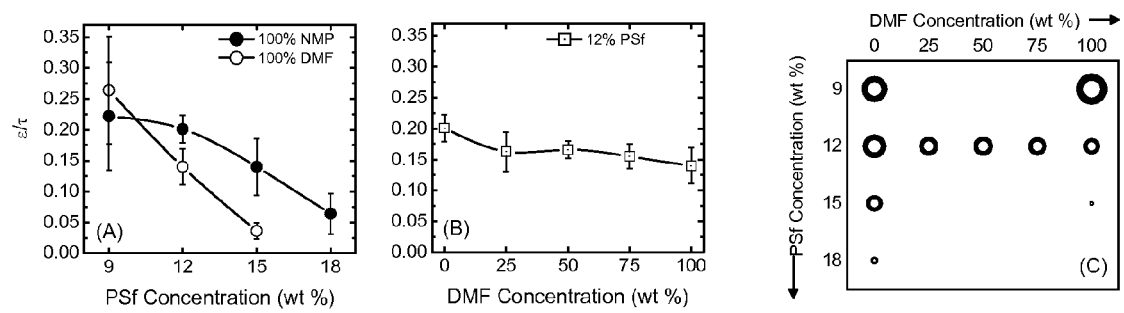
FIGS. 18A-C show a comparison of calculated porosity parameter $\epsilon/\tau$ between the different TFC FO membranes.

FIG. 18 presents the membrane porosities in a manner identical to how FIG. 17 presents the FO water fluxes. For casting solutions containing 100% NMP or DMF, $\epsilon/\tau$ increased as the PS concentration decreased (FIG. 18A). The changes in $\epsilon/\tau$ were more dramatic for 100% DMF than 100% NMP, as indicated by the greater slope of the trend line. Of all the membranes cast, the highest value of $\epsilon/\tau$ was achieved using a PS concentration of 9 wt % and DMF as a solvent.

FIG. 18B displays $\epsilon/\tau$ for membranes cast from solutions containing 12 wt % PS with varying solvent compositions. Notably, after accounting for the effect of membrane thickness on water flux performance, the value of $\epsilon/\tau$ decreases as the amount of DMF increases even though the water flux increased over most of this range. This highlights the importance of both the support layer structure and the active layer properties in determining membrane performance, a topic that will be discussed in more detail in subsequent sections. The bubble graph plot of FIG. 18C provides a visual summary of the $\epsilon/\tau$ values for the membrane matrix evaluated in this study.

RO Performance and Membrane Active Layer Parameters

Figure 19:
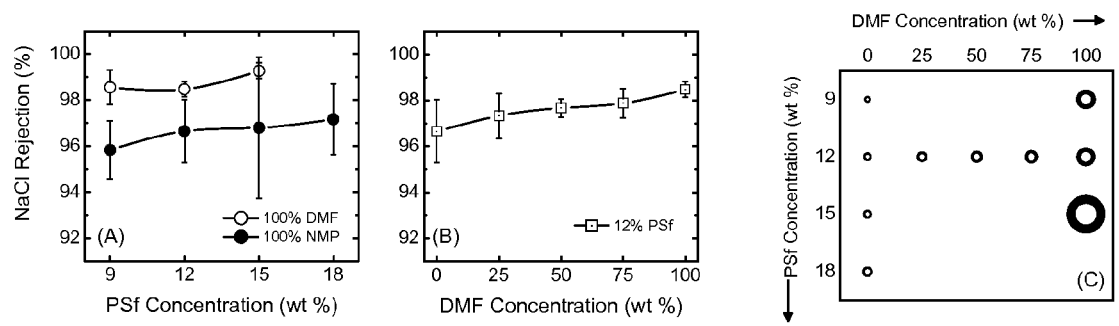
FIGS. 19 A-C show a comparison of observed NaCl rejection between the different TFC FO membranes, as measured from RO experiments.

Permeate water flux and NaCl rejection, R, of all the cast membranes were measured in an RO cross-flow cell. The tests were carried out under conditions typical of brackish water desalination, with an applied pressure of 400 psi (27.6 bar) and a feed NaCl concentration of 50 mM. This allowed the calculation of the polyamide thin film parameters: A, the intrinsic water permeability, and B, the intrinsic NaCl permeability coefficient. Values of A and R are reported in Table 3 and FIG. 19.

All membranes showed NaCl rejection values in excess of 95.5%. The variability in selectivity within membranes cast from a single support layer recipe is ascribed to defects that occur during hand-casting of the PA layers and is likely to be minimized on a manufacturing line. However, some differences and trends between membranes cast from different recipes were noticed. These variations in selectivity are attributed to the ability to form a functional PA active layer on support skin layers with different surface porosities and pore sizes. In general, NaCl rejection increased as PS concentration increased in the support layer casting solution, for both NMP and DMF solvents. This finding suggests that when a thicker skin layer and smaller surface pores are present on the support layer, an integral PA layer can be fabricated more easily. This trend with support surface pore size is expected. However, other support properties might impact PA formation, such as pore size distribution and number density, and the presence of defects. Salt rejection also increased as DMF concentration increased in the PS casting solution. Additionally, it was observed that salt rejection was higher for membranes cast using DMF solvent (FIG. 19A-B) compared to membranes cast from NMP. This observation confirms that a thicker sponge-like stratum at the top of the support layer helps to minimize PA defects and obtain an active layer with superior transport characteristics.

Figure 20:
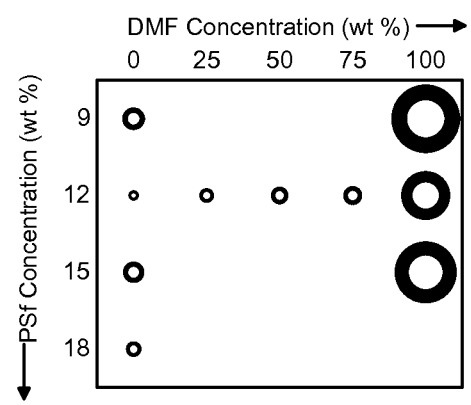
FIG. 20 depicts a bubble graph of $A^2/B$ for the different TFC FO membranes, as measured from RO experiments.

Overall, the opposite trends to NaCl rejection were found for the active layer intrinsic water permeability. At increased support skin layer thickness and decreased size of support surface pores, interfacial polymerization gives rise to a PA layer with lower observed permeability. In general, the sponge-like morphology proves to be a pore structure more apt for the fabrication of a PA layer with better transport characteristics, as indicated in FIG. 20, which presents the figure of merit for the different TFC FO membranes. The figure of merit is defined as $A^2/B$, where A is the intrinsic water permeability coefficient and B is the solute permeability coefficient. Membranes with a sponge-like morphology or with a thicker sponge skin at the top of the support layer are more favorable for the formation of an active film with superior transport properties and have larger $A^2/B$ parameters. A larger figure of merit translates into an improved membrane FO performance.

Performance of Membranes Fabricated without Substrate Pre-Treatment

Membranes without open pores on the support layer bottom surface (i.e., those cast without a pre-wetting step) showed markedly reduced water flux performance in FO tests. Membranes cast from 12 wt % PS in 100% NMP solvent produced a water flux of $5.4\pm0.6$ L m$^{-2}$ h$^{-1}$ (Table 3), which was considerably lower than the water flux of membranes made with an identical formulation but with the fabric pre-treatment step ($13.9\pm1.0$ L m$^{-2}$ h$^{-1}$). These results translate into a significantly lower value of $\epsilon/\tau$ for the membrane support layer (reduced from $0.201\pm0.020$ to $0.040\pm0.008$). Similar results were observed for membranes cast from 15 wt % PS in 100% NMP. FO water flux was diminished drastically from $9.2\pm0.2$ L m$^{-2}$ h$^{-1}$ to below the detection limit of the measuring system. This result demonstrates the need to produce an open bottom surface by preventing the formation of a dense PS wetting layer, i.e., the enrichment of PS at the polymer solution-substrate interface that blocks the pores of the support layer.

Performance of Membranes Fabricated at Higher Initial Polymer Film Thickness

Membranes with finger-like macrovoids that do not span the entire support layer thickness exhibited lower FO water flux (5.6 L m$^{-2}$ h$^{-1}$) than membranes where the macrovoids extended to the layer bottom ($13.9\pm1.0$ L m$^{-2}$ h$^{-1}$). However, a higher initial polymer film thickness would result in a thicker support layer which, in turn, causes more severe ICP effect, thereby reducing membrane performance. A less biased approach is to decouple the effects of support layer thickness by comparing their $\epsilon/\tau$ values. When the macrovoids did not span the support layer, $\epsilon/\tau$ was determined to be 0.057, almost a 70% decrease relative to the membranes with macrovoids spanning the support thickness, which had a $\epsilon/\tau$ value of $0.201\pm0.022$.

Relating Membrane Structure to FO Performance
The Ideal Support Layer Maximizes $\epsilon/\tau$ ICP, which occurs because the support layer of the membrane acts as an unstirred boundary layer, causes the observed water flux in FO operation to be lower than that predicted from bulk osmotic pressure difference. Therefore, increasing $\epsilon/\tau$ (i.e., decreasing the effective thickness of the boundary layer, S) should improve FO performance. For membranes cast from a single solvent (100% NMP or DMF), $\epsilon/\tau$ decreases with increasing PS wt %. In particular, for NMP solvent this trend corresponds to a decrease in finger-like structure width as seen in the cross-sectional micrographs (FIGS. 14A and 15A-B-C) and the data presented in Table 1. These changes in ϵ/τ correlate directly with changes in measured water fluxes. Lowering polymer concentration in the casting solution is one way to increase the porosity and hence, to reduce ICP.

A Finger-Like Morphology Maximizes ϵ/τ

At an equivalent PS concentration in the casting solution, membranes with finger-like morphology have a higher ϵ/τ than the corresponding membranes with a sponge-like morphology. For 12 wt % PS, an increase in DMF content in the casting solution translates into smaller finger-like features that correlate with a steady decrease in ϵ/τ (FIGS. 14 and 18). Also, when using 100% DMF as a solvent and lowering the polymer concentration, the dramatic increase in ϵ/τ achieved by using a 9 wt % PS solution is explained by the transition from a sponge-like to a finger-like morphology (FIG. 15D). These observations confirm that a finger-like morphology with large macrovoids is favorable for reduction of ICP in FO operations.

Macrovoids Extending to the Bottom Surface Maximize ϵ/τ

The structure-performance relationship of membranes with a dense PS wetting layer or with truncated macrovoids suggests that driving the formation of the macrovoids to the bottom surface is necessary for producing high performance membranes. Despite macrovoids spanning most of the support layer thickness when substrate layer was not wetted during fabrication these membranes have significantly lower calculated values of ϵ/τ and water fluxes than those obtained from similar formulations but possessing continuous macrovoids. This difference is due to the dense layer at the bottom surface, which contributes an additional resistance to mass transfer, thus increasing ICP and reducing water flux. In order to maximize performance in FO, an open bottom layer with a high porosity is necessary.

The Ideal Support Layer Structure Facilitates a High Performance Active Layer

Further examination of the results for membranes cast from different solvent mixtures and 12 wt % PS demonstrates that driving the formation of macrovoids and reducing ICP is not the only consideration when fabricating the PS support layer. As the ratio of DMF to NMP in the casting solution increases, the inhibition of macrovoid formation correlates to a lower ϵ/τ. However, the trend of FO water fluxes for these membranes does not correlate directly with the support layer porosity. For instance, while ϵ/τ decreased as DMF content increased (FIG. 18B), the corresponding water fluxes increased over the same range (FIG. 17B). In another example, ϵ/τ decreased more sharply with increasing PS concentration for DMF solvent in comparison to NMP solvent (FIG. 18A). However, the same trend was not observed for the FO water flux, with the DMF membranes showing a more gradual decline in water flux (FIG. 17A). These results imply that the adverse effects of ICP on FO water flux can be offset, and at times overcome, by the positive effect achieved by fabricating a PA layer with superior transport properties (i.e., high A and low B values). Therefore, having a large $A^2/B$ parameter is as important to FO performance as obtaining a low structural parameter S, and can be accomplished by achieving a favorable morphology in the top skin portion of the support layer. Further attempts to modify the support layer structure in order to fabricate a high performance FO membrane need to optimize both the bulk and skin layer structures.

REFERENCES

All of the U.S. patents and U.S. published patent applications cited herein are hereby incorporated by reference.

EQUIVALENTS

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

We claim:

1. A thin-film composite membrane, comprising:
    a porous support comprising at least one of a polysulfone or a polyethersulfone having a first side with a first plurality of pores, and a second side with a second plurality of pores, wherein the porous support is produced with the at least one of the polysulfone or the polyethersulfone at a concentration of 12% weight in the presence of a N,N-dimethylformamide co-solvent of no greater than 25% weight such that the support has a structural parameter of about 676 μm and the average diameter of substantially all of the first plurality of pores is between about 0.1 nm and about 100 nm, and the average diameter of substantially all of the second plurality of pores is between about 2,000 nm and about 3,000 nm;
    a polymeric additive dispersed in the porous support in an amount from about 1% to about 50% by weight of the porous support; and
    a semi-permeable selective barrier on the first side of the porous support.

2. The membrane of claim 1, wherein the average diameter of substantially all of the first plurality of pores is between about 1 nm and about 50 nm.

3. The membrane of claim 1, wherein the polymeric additive is selected from the group consisting of polyalkylene glycols, polyalkylene oxides, polyoxoalkylenes, acrylamides, catecholamines and polyetheramines.

4. The membrane of claim 1, further comprising a backing layer on the second side of the porous support.

5. The membrane of claim 4, wherein the porous support is enmeshed in the backing layer.

6. The membrane of claim 4, wherein the backing layer is a woven or non-woven fabric.

7. The membrane of claim 4, wherein the backing layer comprises polyester.

8. The membrane of claim 4, wherein the average thickness of the backing layer is between about 10 μm and about 50 μm.

9. The membrane of claim 1, wherein the selective barrier comprises a semi-permeable, interfacially-polymerized polyamide matrix.

10. The membrane of claim 1, wherein the average thickness of the selective barrier is between about 20 nm and about 500 nm.

11. A method of fabricating a porous support comprising at least one of a polysulfone or a polyethersulfone having a first side with a first plurality of pores, and a second side with a second plurality of pores, wherein the average diameter of substantially all of the first plurality of pores is between about 0.1 nm and about 100 nm, and the average diameter of substantially all of the second plurality of pores is between about 2,000 nm and about 3,000 nm; the method comprising the steps of:
- preparing a polymer solution comprising at least one of the polysulfone or the polyethersulfone at a concentration of 12% weight in the presence of a N,N-dimethylformamide co-solvent of no greater than 25% weight and a main solvent, and a polymeric additive;
- contacting a surface with the polymer solution; and
- evaporating the polymer solution, wherein the support has a structural parameter of about 676 μm;
- dispersing the polymeric additive in the porous support in an amount from about 1% to about 50% by weight of the porous support; and
- depositing a semi-permeable selective barrier on the first side of the porous support.

12. The method of claim 11, wherein the average diameter of substantially all of the first plurality of pores is between about 1 nm and about 50 nm.

13. The method of claim 11, wherein the polymeric additive is selected from the group consisting of polyalkylene glycols, polyalkylene oxides, polyoxoalkylenes, acrylamides, catecholamines and polyetheramines.

14. The method of claim 11, wherein a portion of the porous support polymerizes within the surface.

15. The method of claim 11, wherein the surface is a woven or non-woven fabric.

16. The method of claim 11, further comprising the step of contacting the surface with a second liquid before the surface is contacted with the polymer solution.

17. The method of claim 16, wherein the second liquid comprises a main solvent and a co-solvent.

18. The method of claim 16, wherein the second liquid comprises an additive.

19. The method of claim 18, wherein the second liquid comprises an additive selected from the group consisting of polyalkylene glycols, polyalkylene oxides, polyoxoalkylenes, acrylamides, catecholamines and polyetheramines.

20. The method of claim 11, wherein the main solvent is selected from the group consisting of 1-methyl-2-pyrrolidinone (NMP), N,N-dimethylformamide (DMF), dimethyl sulfoxide (DMSO), triethyl phosphate, dimethyl acetamide, and combinations thereof.

21. The method of claim 11, wherein the main solvent is 1-methyl-2-pyrrolidinone (NMP); and the co-solvent is N,N-dimethylformamide (DMF).

22. The method of claim 11, wherein the surface comprises polyester.

23. The method of claim 11, wherein the average thickness of the surface is between about 10 μm and about 50 μm.

* * * * *